US012560232B2

(12) United States Patent
Yoshizawa et al.

(10) Patent No.: US 12,560,232 B2
(45) Date of Patent: Feb. 24, 2026

(54) SWITCH DEVICE, PUSH-TYPE INPUT DEVICE, AND ELECTRONIC SHIFTER

(71) Applicant: ALPS ALPINE CO., LTD., Tokyo (JP)

(72) Inventors: Toshiharu Yoshizawa, Miyagi (JP); Fumihito Nikami, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 398 days.

(21) Appl. No.: 18/174,109

(22) Filed: Feb. 24, 2023

(65) Prior Publication Data

US 2023/0313881 A1      Oct. 5, 2023

(30) Foreign Application Priority Data

Mar. 30, 2022    (JP) ................................. 2022-057383

(51) Int. Cl.
| | |
|---|---|
| *F16H 59/00* | (2006.01) |
| *F16H 59/12* | (2006.01) |
| *H01H 13/14* | (2006.01) |
| *H01H 15/10* | (2006.01) |
| *F16H 59/02* | (2006.01) |

(52) U.S. Cl.
CPC ............. *F16H 59/12* (2013.01); *H01H 13/14* (2013.01); *H01H 15/10* (2013.01); *F16H 2059/0221* (2013.01); *F16H 2306/00* (2013.01); *H01H 2231/026* (2013.01)

(58) Field of Classification Search
None
See application file for complete search history.

(56) References Cited

U.S. PATENT DOCUMENTS

| | | | | |
|---|---|---|---|---|
| 2007/0294602 | A1* | 12/2007 | Miller ................... | G06F 11/188 |
| | | | | 701/41 |
| 2016/0153547 | A1 | 6/2016 | Shibata et al. | |
| 2021/0095756 | A1* | 4/2021 | Mendoza-Vega ...... | B60K 20/06 |
| 2024/0286589 | A1* | 8/2024 | Inuzuka ................. | B60T 7/042 |

FOREIGN PATENT DOCUMENTS

| | | |
|---|---|---|
| JP | 2016-109292 | 6/2016 |
| JP | 2019-207142 | 12/2019 |

OTHER PUBLICATIONS

Japanese Office Action for 2022-057383 mailed on Nov. 18, 2025.

* cited by examiner

*Primary Examiner* — Paul B Yanchus, III
(74) *Attorney, Agent, or Firm* — IPUSA, PLLC

(57)      ABSTRACT

A switch device includes three or more sensors configured to detect three or more respective measurement values with respect to an operation position of a switch; a memory; and a processor configured to determine a switching state of the switch by making a majority decision based on measurement levels of the three or more measurement values of the three or more sensors, and determine whether a failure has occurred for each of the three or more sensors. The processor compares a measurement value of one sensor among the three or more sensors with measurement values of other sensors other than the one sensor among the three or more sensors, and determines that the one sensor has failed in a case where half or more of the measurement values of the other sensors are not in a predetermined range of the measurement value of the one sensor.

16 Claims, 21 Drawing Sheets

VOLTAGE

ROTATION ANGLE (DEGREES)

AR

——— +SIN1

------ −SIN1

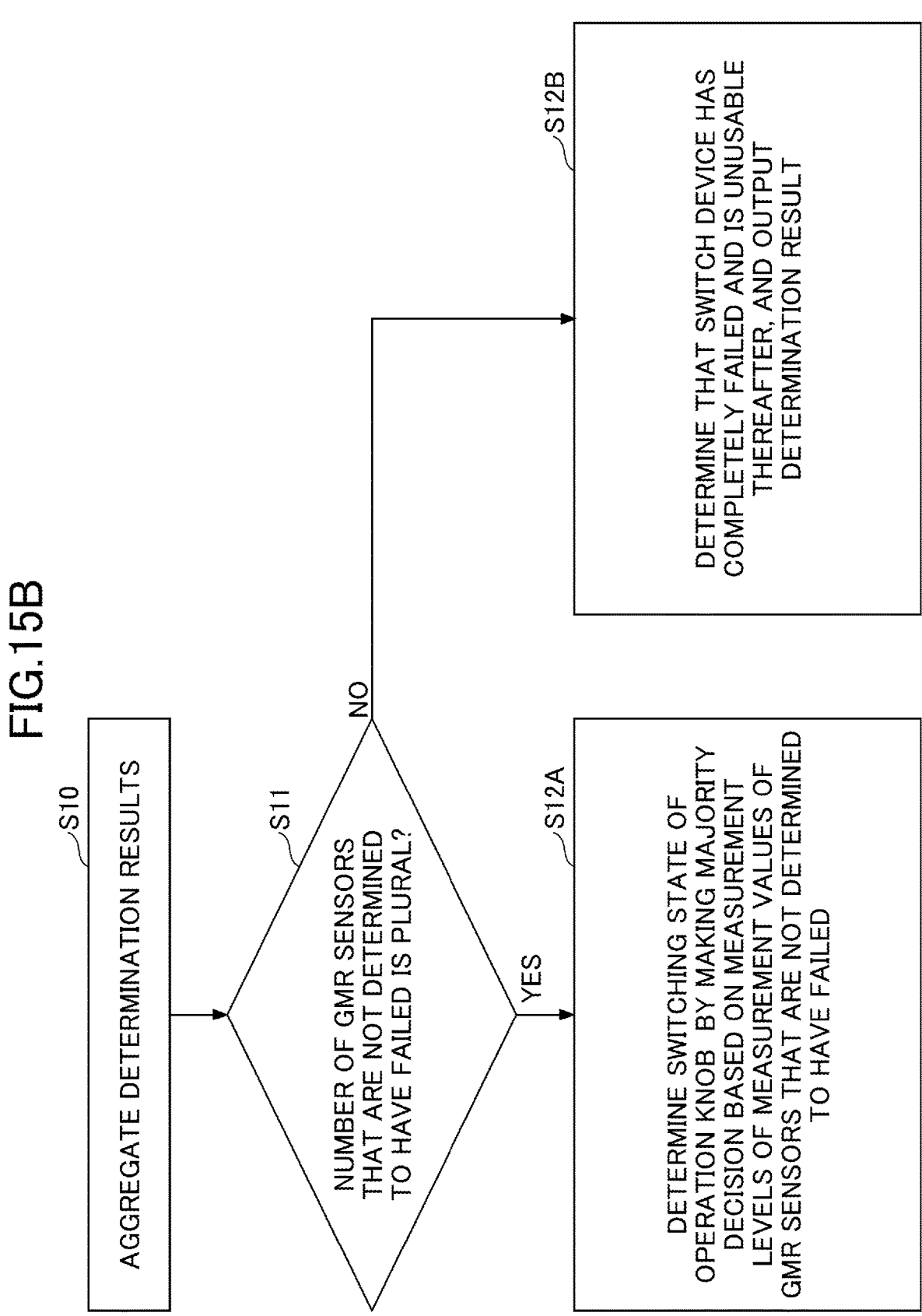

S10
AGGREGATE DETERMINATION RESULTS

S11
NUMBER OF GMR SENSORS THAT ARE NOT DETERMINED TO HAVE FAILED IS PLURAL?

NO

YES

S12A
DETERMINE SWITCHING STATE OF OPERATION KNOB BY MAKING MAJORITY DECISION BASED ON MEASUREMENT LEVELS OF MEASUREMENT VALUES OF GMR SENSORS THAT ARE NOT DETERMINED TO HAVE FAILED

S12B
DETERMINE THAT SWITCH DEVICE HAS COMPLETELY FAILED AND IS UNUSABLE THEREAFTER, AND OUTPUT DETERMINATION RESULT

FIG.16

| | NUMBER OF FAILED SENSORS IS 0 | NUMBER OF FAILED SENSORS IS 1 | NUMBER OF FAILED SENSORS IS 2 | NUMBER OF FAILED SENSORS IS 3 | NUMBER OF FAILED SENSORS IS 4 |
|---|---|---|---|---|---|
| SWITCHING DETERMINATION UNIT | DETERMINE SWITCHING STATE IF THREE OR MORE SENSORS ARE IN ON-RANGE OR OFF-RANGE | DETERMINE SWITCHING STATE IF TWO OR MORE SENSORS ARE IN ON-RANGE OR OFF-RANGE | DETERMINE SWITCHING STATE IF TWO SENSORS ARE IN ON-RANGE OR OFF-RANGE | STOP OPERATION | STOP OPERATION |
| FAILURE DETERMINATION UNIT | DETERMINE THAT SENSOR HAS FAILED IF MEASUREMENT VALUES OF LESS THAN TWO OTHER SENSORS ARE IN PREDETERMINED RANGE E | DETERMINE THAT SENSOR HAS FAILED IF NONE OF MEASUREMENT VALUES OF OTHER SENSORS IS IN PREDETERMINED RANGE E | DETERMINE THAT SENSORS HAVE FAILED IF EACH OF MEASUREMENT VALUES IS NOT IN PREDETERMINED RANGE E OF OTHER MEASUREMENT VALUE | DO NOT DETERMINE FAILURE BECAUSE THERE IS NO COMPARISON | DO NOT DETERMINE FAILURE BECAUSE THERE IS NO COMPARISON |

SWITCH DEVICE, PUSH-TYPE INPUT DEVICE, AND ELECTRONIC SHIFTER

CROSS-REFERENCE TO RELATED APPLICATIONS

This application is based on and claims priority to Japanese Patent Application No. 2022-057383, filed on Mar. 30, 2022, the entire contents of which are incorporated herein by reference.

BACKGROUND OF THE INVENTION

1. Field of the Invention

The disclosure herein relates to a switch device, a push-type input device, and an electronic shifter.

2. Description of the Related Art

Conventionally, shift lever position determination devices for vehicles are known. Such a conventional shift lever position determination device is configured to, if more than half of signals output from a plurality of position sensors correspond to the same operation position, determine that the same operation position corresponding to half of the signals is an operation position of the shift lever, and, if a majority is not established, determine whether the operation position of the shift lever is on the M operation position side or the N operation position side based on the magnitude relationship of the signals output from the plurality of position sensors (see Patent Document 1, for example).

The conventional shift lever position determination device for a vehicle is not configured to take measures to detect failures or avoid an erroneous determination. In particular, an erroneous determination cannot be tolerated in devices requiring functional safety such as devices related to driving systems of vehicles.

RELATED-ART DOCUMENTS

Patent Documents

Patent Document 1: U.S. Patent Application Publication No. 2016/0153547

SUMMARY OF THE INVENTION

It is desirable to provide a switch device, a push-type input device, and an electronic shifter that are capable of avoiding an erroneous determination of a failure due to a measurement error or the like.

According to an embodiment of the present disclosure, a switch device includes three or more sensors configured to detect three or more respective measurement values with respect to an operation position of a switch; a memory; and a processor coupled to the memory and configured to determine a switching state of the switch by making a majority decision based on measurement levels of the three or more measurement values of the three or more sensors, and determine whether a failure has occurred for each of the three or more sensors. The processor compares a measurement value of one sensor among the three or more sensors with measurement values of other sensors other than the one sensor among the three or more sensors, and determines that the one sensor has failed in a case where half or more of the measurement values of the other sensors are not in a predetermined range of the measurement value of the one sensor.

BRIEF DESCRIPTION OF THE DRAWINGS

Other objects and further features of the present invention will be apparent from the following detailed description when read in conjunction with the accompanying drawings, in which:

FIG. 5 is a diagram illustrating an electrical configuration of the push-type shifter device according to the embodiment;

FIG. 10A is a diagram illustrating a configuration of a magnetic sensor 107C;

FIG. 13B is a diagram illustrating one problem with the failure determination method according to the comparative example;

FIG. 15B is a flowchart illustrating a process performed by a switching determination unit 122 and the failure determination unit 123; and FIG. 16 is a diagram illustrating a summary of determination patterns of the switching determination unit 122 and the failure determination unit 123.

DESCRIPTION OF THE EMBODIMENTS

In the following, a switch device, a push-type input device, and an electronic shifter according to embodiments of the present disclosure will be described with reference to the accompanying drawings.

EMBODIMENTS (Overview of Push-Type Shifter Device 10)

Figure 1:
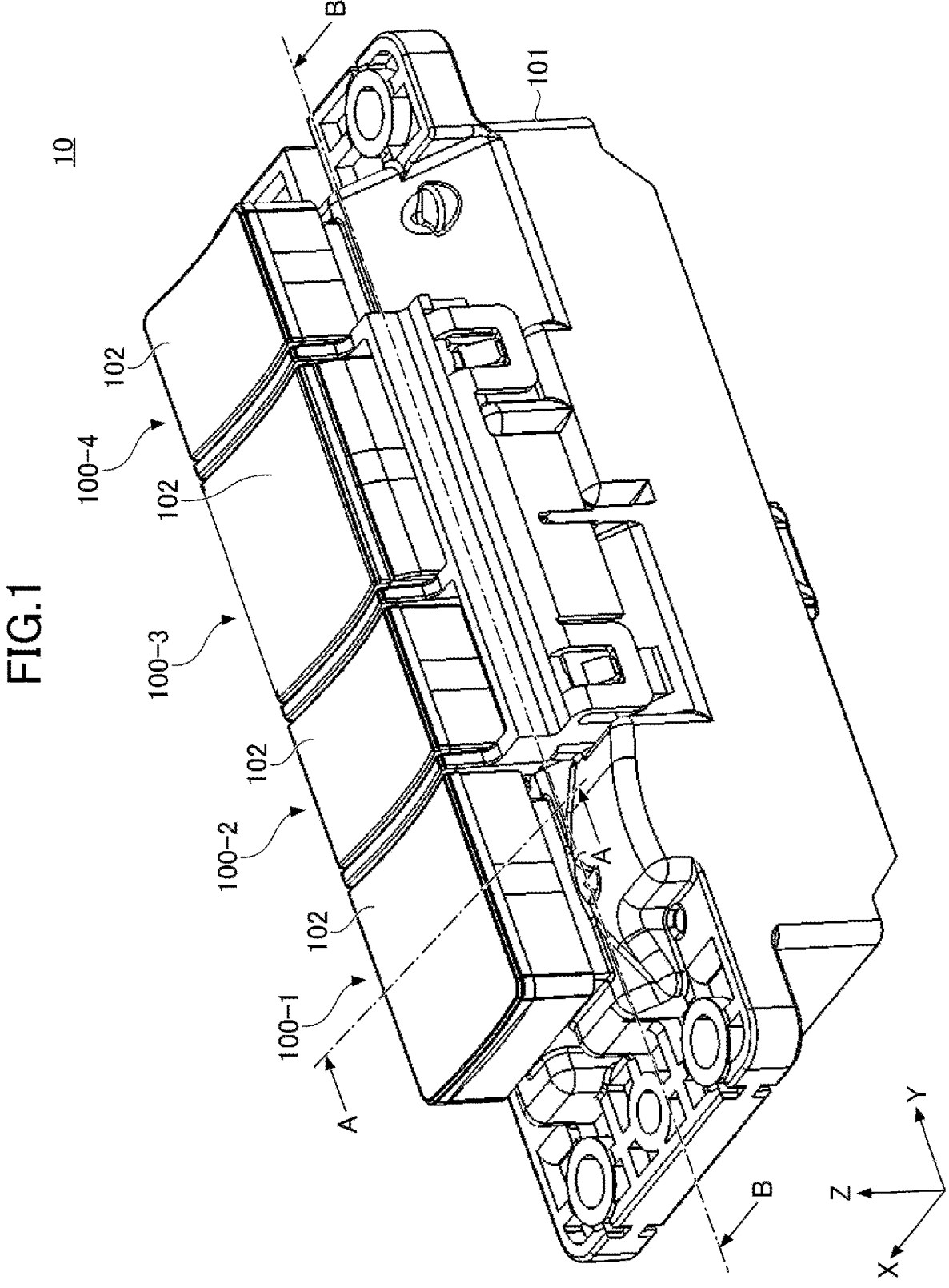
FIG. 1 is a perspective view of the exterior of a push-type shifter device according to an embodiment.

FIG. 1 is a perspective view of the exterior of a push-type shifter device 10 according to an embodiment. The push-type shifter device 10 is an example of a push-type input device, and is also an example of an electronic shifter. In the following description, for the sake of convenience, the X-axis direction is referred to as a front-rear direction, the Y-axis direction is referred to as a left-right direction, and the Z-axis direction is referred to as an upper-lower direction. The positive X-axis direction is referred to as a forward direction, the positive Y-axis direction referred to as a rightward direction, and the positive Z-axis is referred to as an upward direction. These directions indicate a relative positional relationship within the device, and are not intended to limit the installation direction or the operating direction of the device. As long as the same relative positional relationship is maintained within the device, any different installation directions and operating directions are intended to be within the scope of the present disclosure.

The push-type shifter device 10 illustrated in FIG. 1 is a device that is installed in a vehicle such as an automobile and receives an operation for selecting a shift position of the vehicle. As illustrated in FIG. 1, the push-type shifter device 10 includes four push-type input mechanisms 100 (100-1 to 100-4) and a case 101. The four push-type input mechanisms 100 are arranged in a line in the left-right direction (Y-axis direction), and in this state, the four push-type input mechanisms 100 are integrated by the one case 101. Each of the four push-type input mechanisms 100 includes an operation knob 102 at the top, and an operator can perform an operation for selecting a shift position corresponding to the operation knob 102 by pushing the operation knob 102.

(Configuration of Push-Type Input Mechanism 100)

Figure 2:
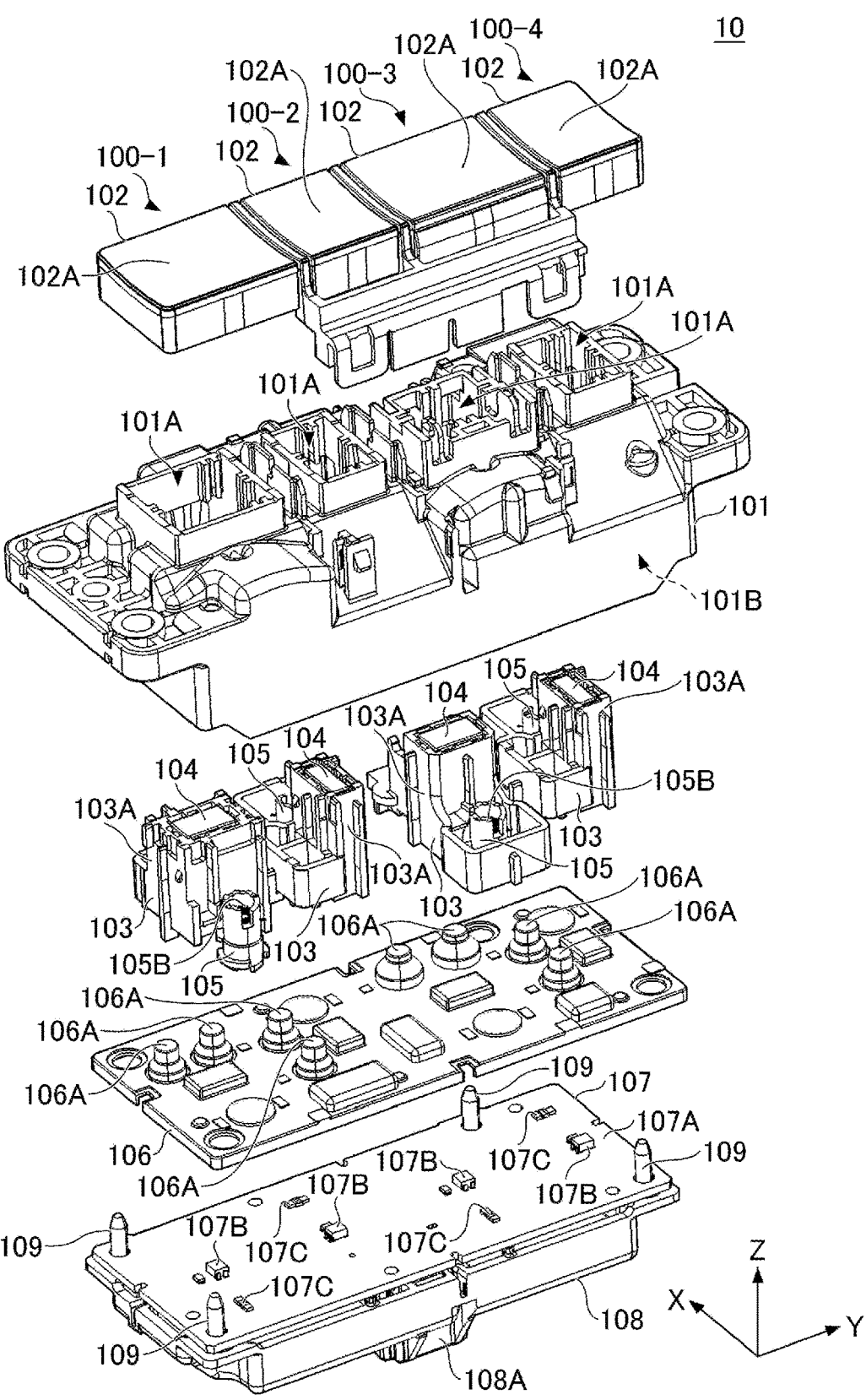
FIG. 2 is an exploded perspective view of the push-type shifter device according to the embodiment.
Figure 3:
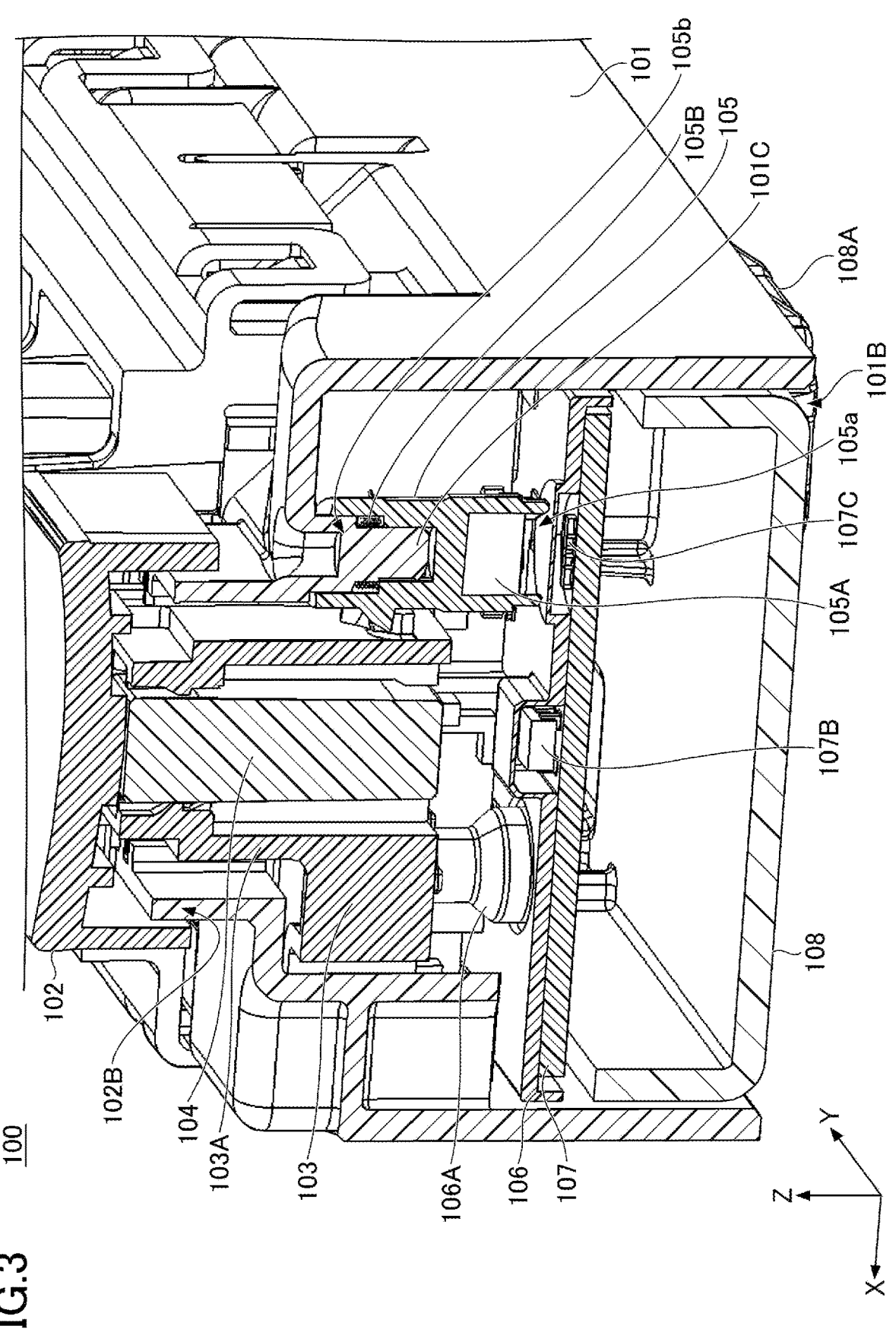
FIG. 3 is a perspective cross-sectional view of the push-type shifter device according to the embodiment.
Figure 4:
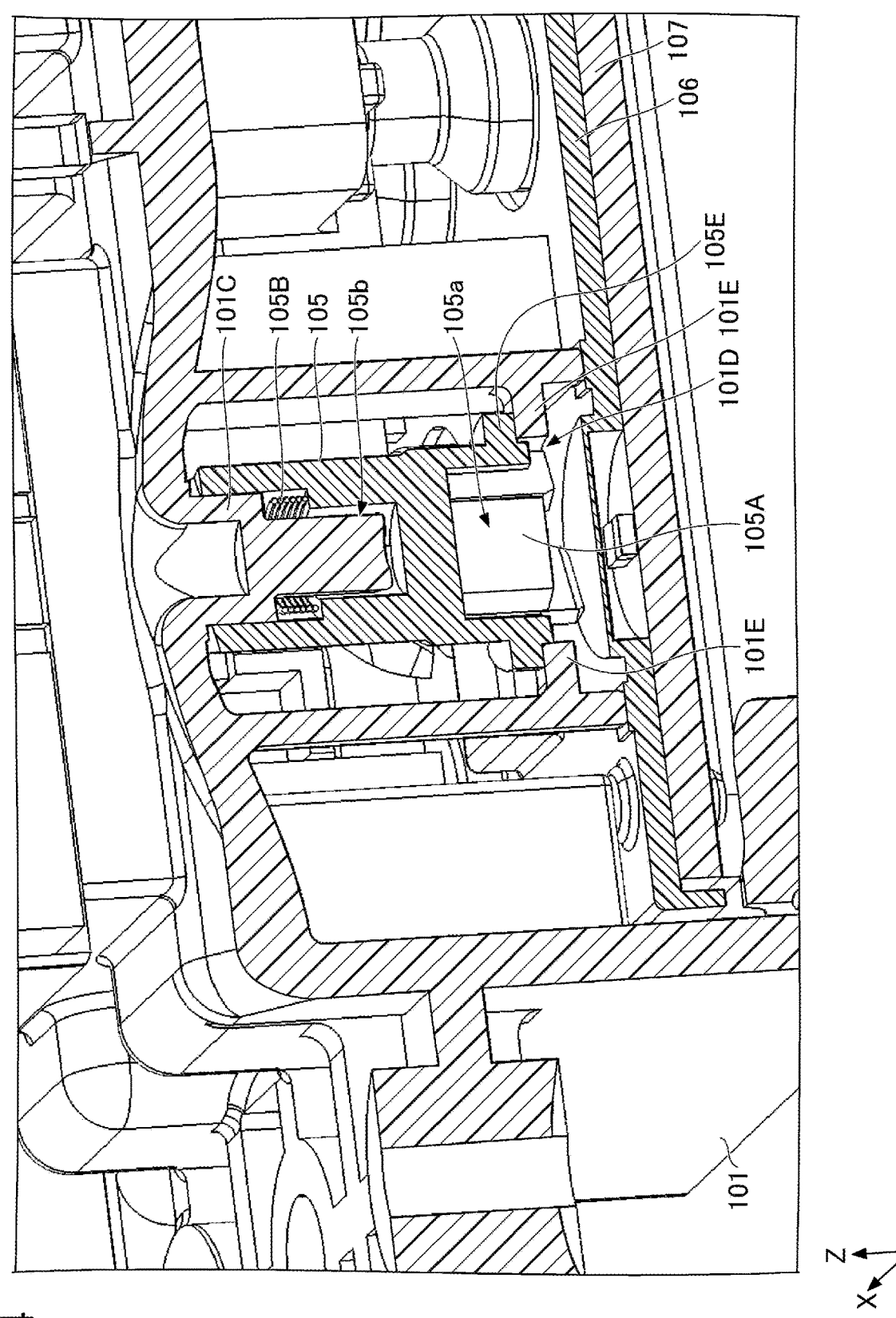
FIG. 4 is a partially enlarged perspective cross-sectional view of the push-type shifter device according to the embodiment.

FIG. 2 is an exploded perspective view of the push-type shifter device 10 according to the embodiment. FIG. 3 is a perspective cross-sectional view of the push-type shifter device 10 according to the embodiment. FIG. 4 is a partially enlarged perspective cross-sectional view of the push-type shifter device 10 according to the embodiment. FIG. 3 depicts a cross-section of the push-type input mechanism 100-1 of the push-type shifter device 10 taken along the XZ plane (a cross-section taken through A-A of FIG. 1). FIG. 4 depicts a cross-section of the push-type input mechanism 100-1 (in particular, a rotating body 105) of the push-type shifter device 10 taken along the YZ plane (a cross-section taken through B-B of FIG. 2).

As illustrated in FIG. 2, the push-type shifter device 10 includes the four push-type input mechanisms 100-1 through 100-4, the operation knob 102, the case 101, a slider 103, a light guide 104, a rotating body 105, a rubber sheet 106, a substrate 107, and a cover 108. The operation knob 102, the slider 103, the light guide 104, and the rotating body 105 are provided for each of the four push-type input mechanisms 100-1 through 100-4.

The operation knob 102 is a component made of a resin and is configured to receive a push operation from the operator. The operation knob 102 is an example of a switch. In the example illustrated in FIG. 2, the operation knob 102 has an approximately rectangular parallelepiped shape. The upper surface of the operation knob 102 is an operation surface 102A for receiving a push operation. The operation surface 102A is substantially flat and slightly curved in a recessed shape. The entire portion corresponding to the lower surface of the operation knob 102 is a lower opening 102B. The upper portion of the slider 103 is fitted into the lower opening 102B from the lower side (negative Z-axis side), and thus, the operation knob 102 is fixedly attached to the upper portion of the slider 103. Accordingly, the operation knob 102 can move in the upper-lower direction (Z-axis direction) integrally with the slider 103. That is, the operation knob 102 can slide the slider 103 downward (in the negative Z-axis direction) in response to a push operation being performed on the operation surface 102A.

The case 101 is a container component made of a resin and having an approximately rectangular parallelepiped shape and a hollow structure. The slider 103, the light guide 104, the rotating body 105, the rubber sheet 106, and the substrate 107 are housed in the case 101. An upper opening 101A having a rectangular shape in a plan view is formed in the upper surface of the case 101. The slider 103 is disposed in the upper opening 101A so as to be slidable in the upper-lower direction (Z-axis direction). The entire portion corresponding to the lower surface of the case 101 is a lower opening 101B. The lower opening 101B is closed by the cover 108. As illustrated in FIG. 3, a shaft support 101C having a columnar shape is provided in the case 101 so as to hang downward from the ceiling surface of the case 101. As illustrated in FIG. 3, the shaft support 101C rotatably supports an upper portion of the rotating body 105 by being inserted into an upper opening 105b of the rotating body 105. As illustrated in FIG. 4, a pair of support portions 101E facing each other with a shaft-receiving opening 101D therebetween are provided in the case 101. Further, as illustrated in FIG. 4, a flange 105E that radially extends from the outer peripheral surface of the rotating body 105 is provided on the lower end portion of the rotating body 105. The diameter of the flange 105E is larger than the diameter of the shaft-receiving opening 101D. As illustrated in FIG. 4, the lower end portion of the rotating body 105 is fitted into the shaft-receiving opening 101D. At this time, the flange 105E of the rotating body 105 contacts the upper surfaces of the support portions 101E. Accordingly, the lower portion of the rotating body 105 is rotatably supported, that is, the downward movement of the rotating body 105 is restricted.

The slider 103 is a component made of a resin and is disposed in the upper opening 101A of the case 101 so as to be slidable in the upper-lower direction (Z-axis direction) (an example of a "predetermined sliding direction"). The slider 103 includes a hollow cylindrical portion 103A having an approximately rectangular cylindrical shape that extends in the upper-lower direction (Z-axis direction).

The light guide 104 is a component made of a resin, having a rectangular pillar shape, and is disposed in the hollow cylindrical portion 103A of the slider 103. Light, emitted from a light emitting diode (LED) 107B mounted on a top surface 107A of the substrate 107 and incident on the bottom surface of the light guide 104, is emitted from the top surface of the light guide 104. Accordingly, the light guide 104 guides the light emitted from the LED 107B to the operation knob 102.

The rotating body 105 is a member having an approximately cylindrical shape that extends in the upper-lower direction. The rotating body 105 is disposed on the side of the slider 103 so as to be rotatable about a rotational axis that extends in the upper-lower direction (Z-axis direction). The outer peripheral surface of the rotating body 105 is engaged with the slider 103 such that the rotating body 105 rotates in accordance with the sliding of the slider 103 in the upper-lower direction (details of the engagement will be described later). As illustrated in FIG. 3, a magnet 105A is embedded in a lower opening 105a of the rotating body 105. Further, as illustrated in FIG. 3, the shaft support 101C of the case 101 is inserted into the upper opening 105b of the rotating body 105. Accordingly, the rotating body 105 is rotatably supported by the case 101. Further, in the upper opening 105b of the rotating body 105, an annular torsion spring 105B (an example of a "biasing member") is provided around the shaft support 101C of the case 101. One end portion of the torsion spring 105B is fixed to the shaft support 101C, and the other end portion of the torsion spring 105B is fixed to the rotating body 105. Accordingly, the rotating body 105 is biased at all times in the counterclockwise direction (return rotation direction) as viewed from above by an elastic force generated by the torsion spring 105B. As the slider 103 slides downward (in the negative Z-axis direction) in response to a push operation, the rotating body 105 rotates in the clockwise direction as viewed from above. Then, when the operation knob is released from the push operation, the rotating body 105 can rotate in the counterclockwise direction (return rotation direction) as viewed from above by an elastic force generated by the torsion spring 105B. Therefore, as rubber domes 106A of the rubber sheet 106, which will be described later, push the slider 103 upward (toward the positive Z-side) and the slider 103 returns to its initial position before the push operation, the rotating body 105 can rotate back to its initial position.

The rubber sheet 106 is a sheet-shaped member that is stacked on the top surface 107A of the substrate 107. The rubber sheet 106 is formed of an elastic material (such as silicone rubber). The rubber sheet 106 covers the entire top surface 107A of the substrate 107. Therefore, even if water enters the inside of the case 101, the top surface 107A of the substrate 107 is unlikely to become wet.

On the rubber sheet 106, the two rubber domes 106A are integrally formed at positions facing the bottom surface of the slider 103. Each of the rubber domes 106A is an example of a "clicking sensation-providing mechanism" Each of the rubber domes 106A projects upward from the top surface of the rubber sheet 106. When a push operation is performed by the operator, each of the rubber domes 106A is pressed by the bottom surface of the slider 103 and a dome portion of each of the rubber domes 106A is elastically deformed (bent and inverted), thereby providing a clicking sensation to the operator performing the push operation. As described above, when the operation knob is released from the push operation, the slider 103 is pushed upward (in the positive Z-axis direction) by an elastic force (a force for returning to the initial state) generated by each of the rubber domes 106A, and as a result, the slider 103 can return to the initial position before the push operation.

The substrate 107 is a flat plate-shaped component. The substrate 107 has a rectangular shape in a plan view. The substrate 107 is fixed to the top surface of the cover 108 in an orientation parallel to the XY plane within the case 101. For example, a printed wiring board (PWB) may be used as the substrate 107. The LED 107B and a magnetic sensor 107C are mounted on the top surface 107A of the substrate 107.

The LED 107B is provided at a position directly under the light guide 104. The LED 107B can emit light as controlled by a controller 120 (see FIG. 5) provided outside the push-type shifter device 10. The LED 107B can emit light such that the light enters the light guide 104.

The magnetic sensor 107C is provided at a position directly under the rotating body 105, and faces the magnet 105A provided on the lower end surface of the rotating body 105. The magnetic sensor 107C can detect the rotation angle of the rotating body 105 by detecting changes in the direction of the magnetic flux in accordance with the rotation of the magnet 105A. Then, the magnetic sensor 107C can output rotation angle signals, indicating the detected rotation angle, to the controller 120 (see FIG. 5) via a connector 108A. Note that each of the push-type input mechanisms 100 uses the magnetic sensor 107C (giant magnetoresistive (GMR) sensor) as an example of a "sensor" for detecting the rotation angle. However, the present invention is not limited thereto, and each of the push-type input mechanisms 100 may use any type of sensor (for example, an optical sensor, a mechanical sensor, a capacitive sensor, or a resistive sensor) as another example of a "sensor" for detecting the rotation angle.

The magnetic sensor 107C includes a plurality of GMR sensors that detect the rotation angle of the rotating body 105. The plurality of GMR sensors of the magnetic sensor 107C are examples of a plurality of (three or more) sensors. A configuration of the magnetic sensor 107C will be described later with reference to FIG. 10A.

The cover 108 is a flat plate-shaped component made of a resin and is configured to close the lower opening 101B of the case 101. The cover 108 is screwed and fixed to the case 101 with four screws 109 passing through the cover 108. The connector 108A having a rectangular cylindrical shape is provided on the bottom surface of the cover 108 so as to protrude downward. A plurality of connector pins (not illustrated) hanging downward from the bottom surface of the substrate 107 are disposed inside the connector 108A. An external connector (not illustrated) is fitted into the connector 108A, thereby causing the plurality of connector pins to be electrically connected to the external connector.

(Electrical Configuration of Push-Type Shifter Device 10)

Figure 5:
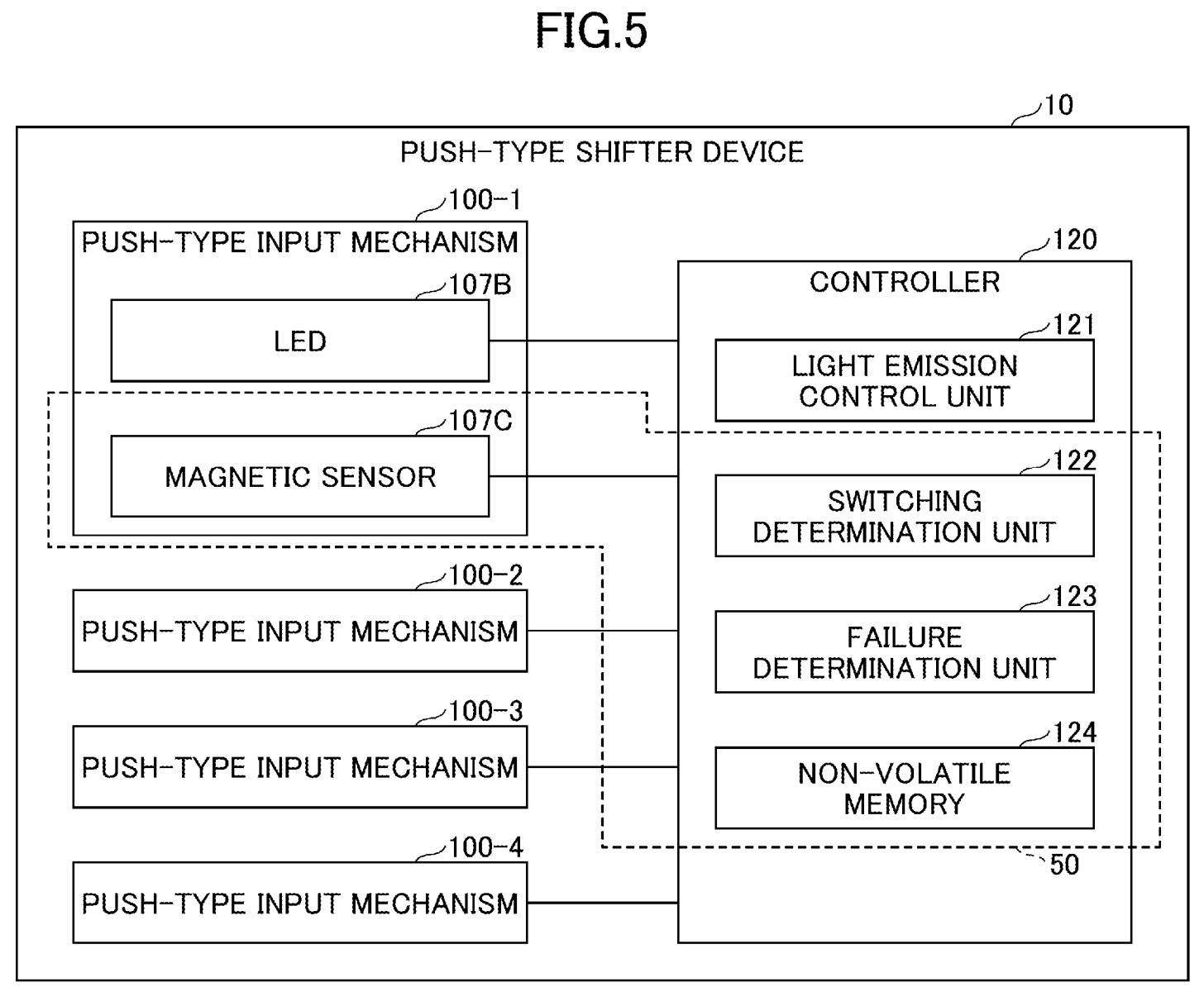

FIG. 5 is a diagram illustrating an electrical configuration of the push-type shifter device 10 according to the embodiment. In FIG. 5, a switch device 50 according to the embodiment is also depicted. As illustrated in FIG. 5, the push-type shifter device 10 includes the four push-type input mechanisms 100-1 through 100-4 and the controller 120. Each of the push-type input mechanisms 100 includes the LED 107B and the magnetic sensor 107C.

The controller 120 is connected to the LED 107B and the magnetic sensor 107C of each of the push-type input mechanisms 100 via the connector 108A (see FIG. 2 and FIG. 3) included in the push-type shifter device 10. The controller 120 includes a light emission control unit 121, a switching determination unit 122, a failure determination unit 123, and a memory 124.

The switch device 50 according to the embodiment includes the magnetic sensor 107C, the switching determination unit 122, the failure determination unit 123, and the memory 124. The switch device 50 illustrated in FIG. 5 includes the magnetic sensor 107C of the push-type input mechanism 100-1; however, the switch device 50 may include a plurality of magnetic sensors 107C, or may include four magnetic sensors 107C of the push-type input mechanisms 100-1 through 100-4.

The controller 120 is implemented by a computer including a central processing unit (CPU), a random access memory (RAM), a read-only memory (ROM), hard disk drive (HDD), an input/output interface, and an internal bus, and the like. The light emission control unit 121, the switching determination unit 122, the failure determination unit 123 represent functions of a program executed by the controller 120, as functional blocks. The memory 124 functionally represents a memory of the controller 120.

The light emission control unit 121 controls light emission of the LED 107B included in each of the push-type input mechanisms 100.

For each of the push-type input mechanisms 100, the switching determination unit 122 determines the switching state of the operation knob 102 (an example of a switch) in response to a push operation, based on detection signals supplied from the magnetic sensor 107C of each of the push-type input mechanisms 100 (that is, based on detection results of the rotation angle by the magnetic sensor 107C). Although details will be described later, the magnetic sensor 107C outputs, for example, four measurement values with respect to the operation position of the operation knob 102, and the switching determination unit 122 determines the switching state of the operation knob 102 by making a majority decision based on measurement levels of the four measurement values.

The failure determination unit 123 determines whether a failure has occurred for each of the GMR sensors included in the magnetic sensor 107C. The push-type shifter device 10 is a product requiring functional safety. Therefore, even if any of the GMR sensors has failed, the failure determination unit 123 must not erroneously determine that the switch is on. A specific process performed by the failure determination unit 123 will be described later with reference to FIGS. 15A and 15B.

The memory 124 retains determination results made by the failure determination unit 123. With this configuration, the determination results made by the failure determination unit 123 about failures of the plurality of GMR sensors of the magnetic sensor 107C can be acquired at a later time. Note that a configuration in which the memory 124 is included in the controller 120 will be described, but memory 124 may be provided separately from the controller 120.

(Upper Sliding Portion 103B and Lower Sliding Portion 103C of Slider 103)

Figure 6:
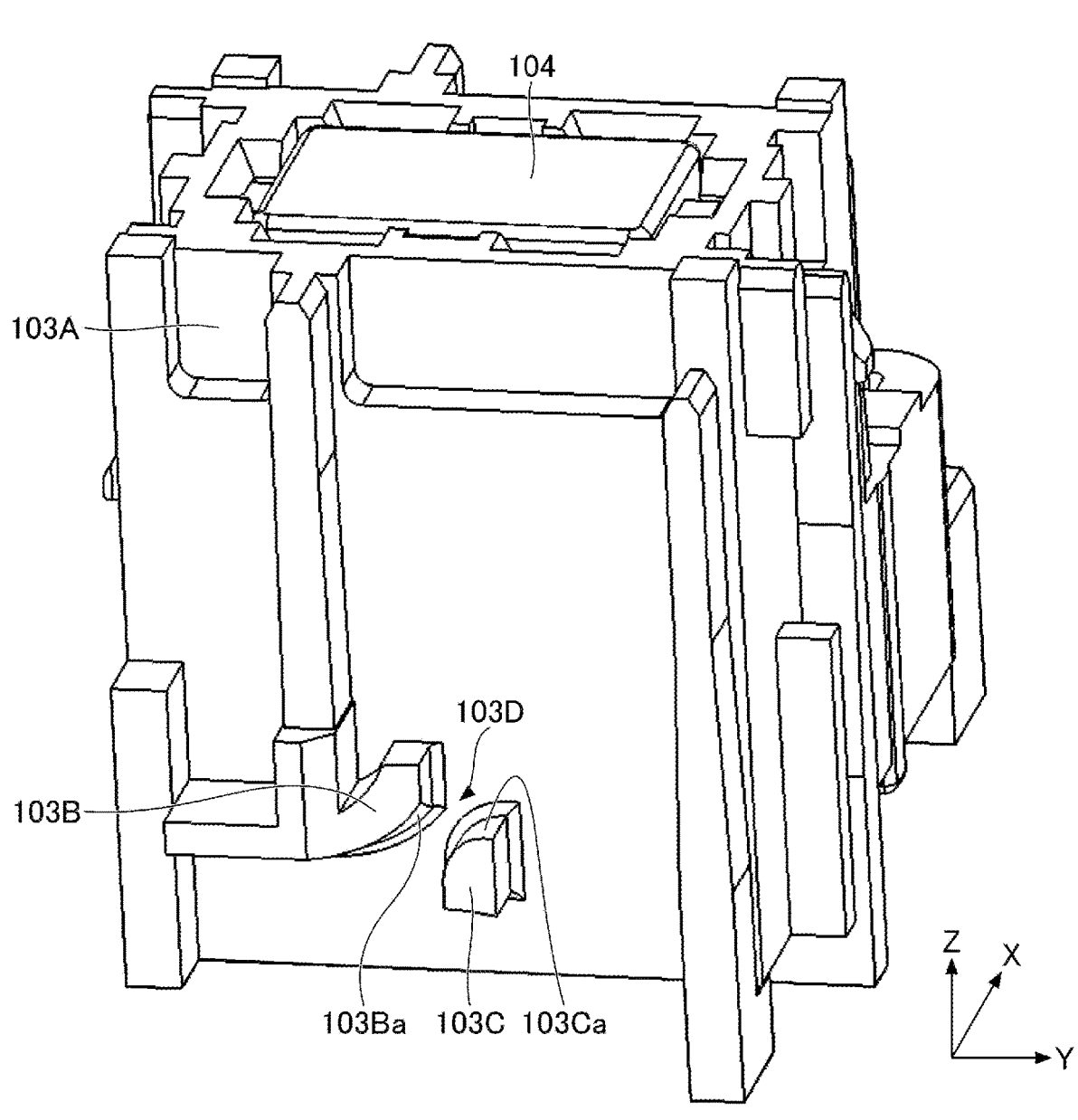
FIG. 6 is a perspective view of the exterior of a slider of a push-type input mechanism according to the embodiment.

FIG. 6 is a perspective view of the exterior of the slider 103 of the push-type input mechanism 100-1 according to the embodiment. In FIG. 6, the side surface on the rear side (negative X-axis side) of the hollow cylindrical portion 103A of the slider 103 of the push-type input mechanism 100-1 is depicted. As illustrated in FIG. 6, the slider 103 of the push-type input mechanism 100-1 includes an upper sliding portion 103B and a lower sliding portion 103C. The upper sliding portion 103B and the lower sliding portion 103C are provided so as to protrude from the side surface on the rear side (negative X-axis side) of the hollow cylindrical portion 103A.

The upper sliding portion 103B is provided slightly above the lower sliding portion 103C (on the positive Z-axis side relative to the lower sliding portion 103C) and slightly to the left of the lower sliding portion 103C (on the negative Y-axis side relative to the lower sliding portion 103C). A gap 103D is formed between the upper sliding portion 103B and the lower sliding portion 103C. The upper sliding portion 103B has an upper sliding surface 103Ba having a curved shape (projecting toward the gap 103D) and facing the gap 103D. The lower sliding portion 103C has a lower sliding surface 103Ca having a curved shape (projecting toward the gap 103D) and facing the gap 103D. The upper sliding portion 103B and the lower sliding portion 103C are provided at positions facing each other with a cam portion 105D, which will be described later, sandwiched therebetween (see FIGS. 8 and 9).

(Cam Portion 105D of Rotating Body 105)

Figure 7:
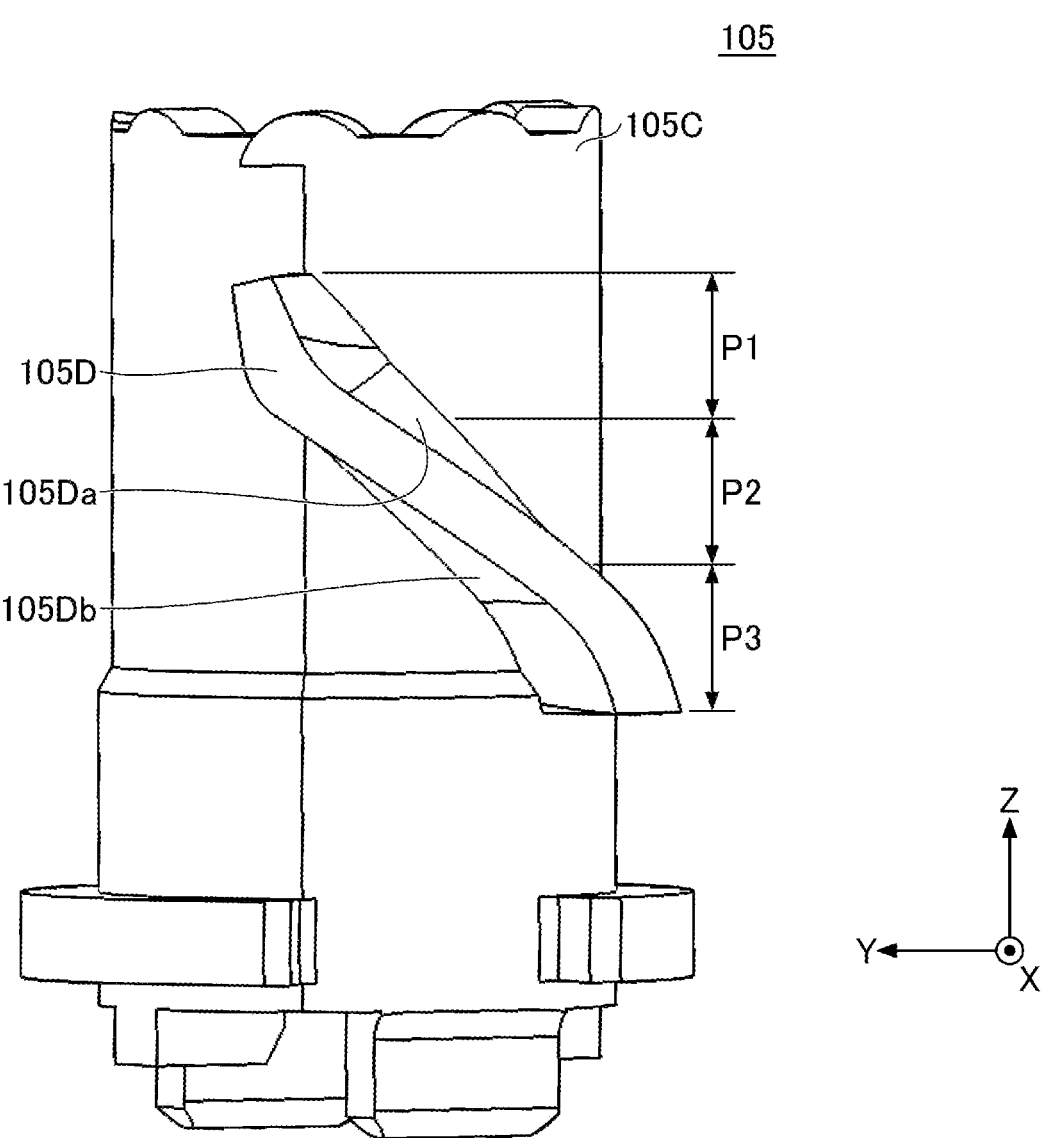
FIG. 7 is a side view of a rotating body of the push-type input mechanism according to the embodiment.

FIG. 7 is a side view of the rotating body 105 of the push-type input mechanism 100-1 according to the embodiment. In FIG. 7, an outer peripheral surface 105C on the front side (positive X-axis side) of the rotating body 105 of the push-type input mechanism 100-1 is depicted. As illustrated in FIG. 7, the cam portion 105D having a spiral shape is provided so as to protrude from the outer peripheral surface 105C on the front side (positive X-axis side) of the rotating body 105 of the push-type input mechanism 100-1. The cam portion 105D extends spirally from the upper end portion toward the lower end portion in a counterclockwise direction along the outer peripheral surface 105C as viewed from above. Further, the cam portion 105D is formed spirally such that its height gradually decreases from the upper end portion toward the lower end portion. An inclined surface on the upper side of the cam portion 105D is an upper cam surface 105Da (an example of a "cam surface"). The upper sliding surface 103Ba (see FIG. 6) of the slider 103 can slide in contact with the upper cam surface 105Da. The upper cam surface 105Da converts the sliding force of the slider 103 into the rotational force of the rotating body 105. An inclined surface on the rear (lower) side of the upper cam surface 105Da of the cam portion 105D is a lower cam surface 105*db*. The lower sliding surface 103Ca (see FIG. 6) of the slider 103 can slide in contact with the lower cam surface 105*db*.

As illustrated in FIG. 7, the upper cam surface 105Da has a rotation start portion P1, a rotation intermediate portion P2, and a rotation end portion P3.

The rotation start portion P1 is a portion where the upper sliding portion 103B of the slider 103 slides until the stroke amount of the operation knob 102 reaches a stroke amount S1 (the rotating body starts rotating).

The rotation intermediate portion P2 is a portion where the upper sliding portion 103B of the slider 103 slides until the stroke amount of the operation knob 102 reaches a stroke amount S2 from the stroke amount S1 (the rotating body is rotating).

The rotation end portion P3 is a portion where the upper sliding portion 103B of the slider 103 slides after the stroke amount of the operation knob 102 reaches the stroke amount S2 (the rotating body stops rotating).

(State of Engagement Between Slider 103 and Rotating Body 105)

Figure 8:
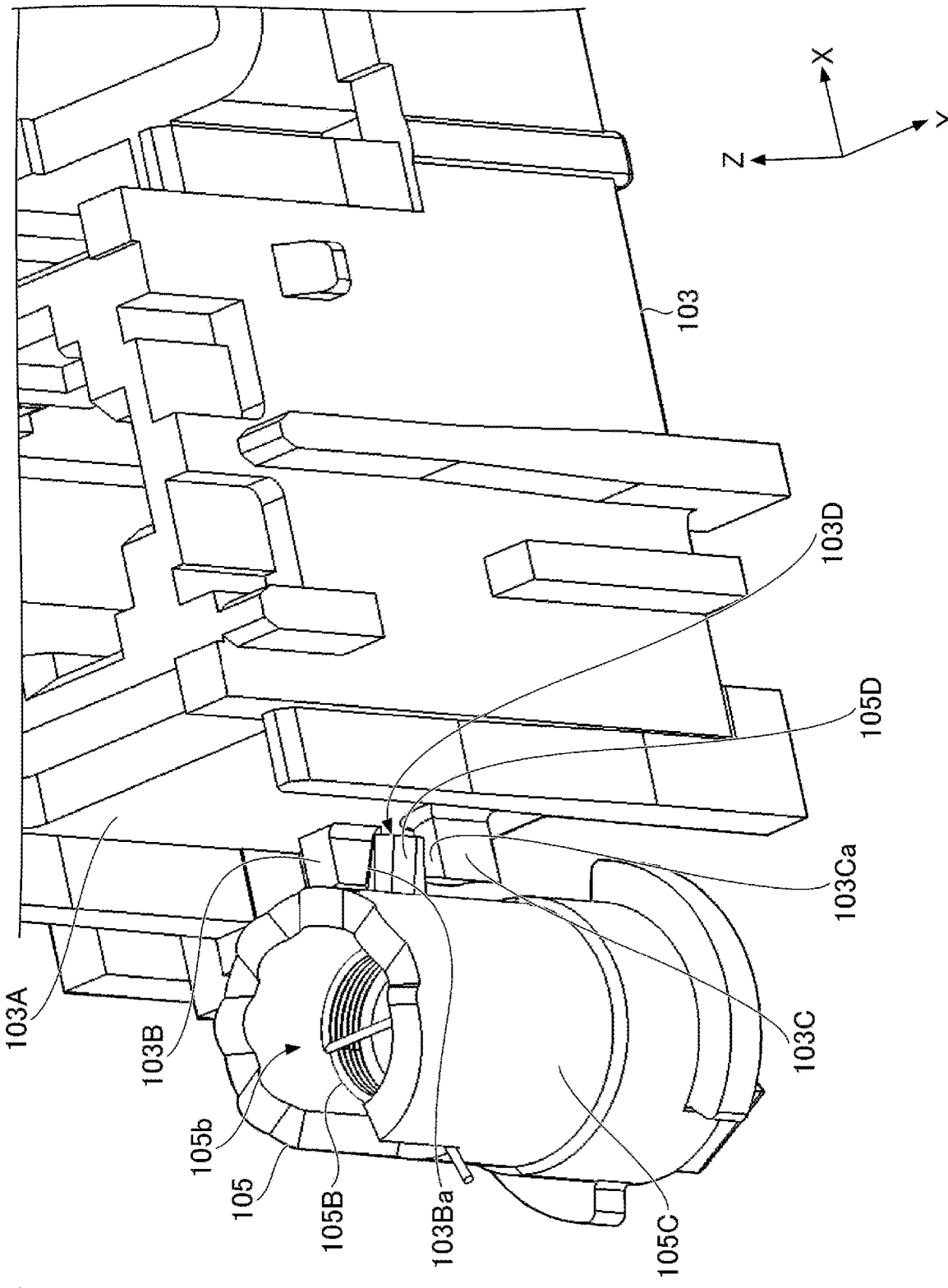
FIG. 8 is a diagram illustrating the state of engagement of an upper sliding portion and a lower sliding portion of the slider with a cam portion of a rotating body in the push-type input mechanism according to the embodiment.
Figure 9:
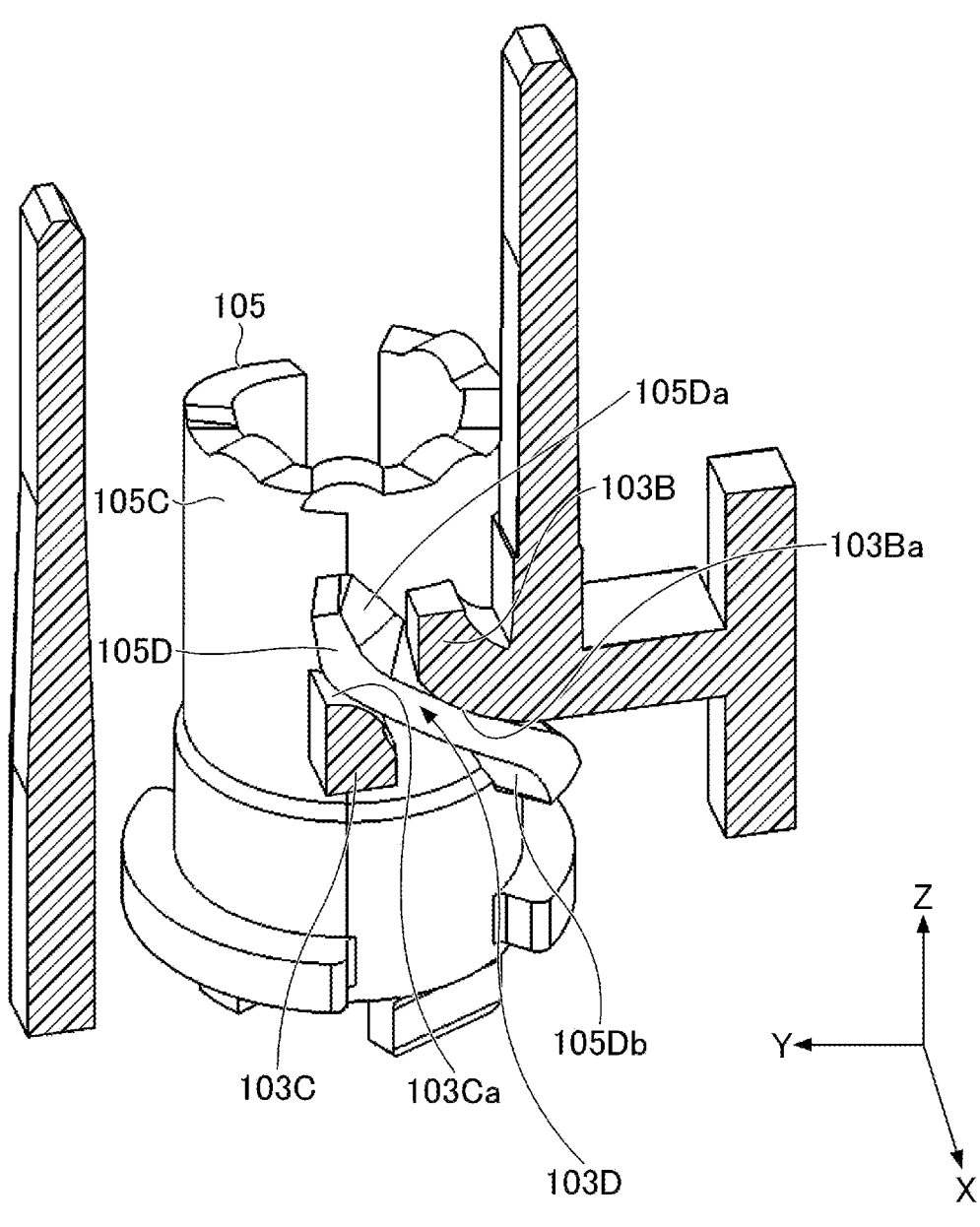
FIG. 9 is a diagram illustrating the state of engagement of the upper sliding portion and the lower sliding portion of the slider with the cam portion of the rotating body in the push-type input mechanism according to the embodiment.

FIG. 8 and FIG. 9 are diagrams illustrating the state of engagement of the upper sliding portion 103B and the lower sliding portion 103C of the slider 103 with the cam portion 105D of the rotating body 105 in the push-type input mechanism 100-1 according to the embodiment. FIG. 8 is a perspective view of the exterior of the slider 103 and the rotating body 105 as viewed from above (from the positive Z-axis side) and the right side (from the positive Y-axis side). FIG. 9 is a cross-sectional view of the slider 103 and the rotating body 105 taken along the YZ plane as viewed from the front (positive X-axis side). In FIG. 9, only the slider 103 is illustrated in cross section.

As illustrated in FIG. 8 and FIG. 9, the cam portion 105D of the rotating body 105 is disposed within the gap 103D between the upper sliding portion 103B and the lower sliding portion 103C of the slider 103. Therefore, as illustrated in FIG. 9, the upper cam surface 105Da of the cam portion 105D can slide in contact with the upper sliding surface 103Ba of the upper sliding portion 103B. Further, as illustrated in FIG. 9, the lower cam surface 105*db* of the cam portion 105D can slide in contact with the lower sliding surface 103Ca of the lower sliding portion 103C.

Accordingly, in the push-type input mechanism 100-1 according to the embodiment, when the slider 103 is moved downward (toward the negative Z-axis side) in accordance with a push operation on the operation knob 102, the upper sliding surface 103Ba of the upper sliding portion 103B of the slider 103 slides on the upper cam surface 105Da of the cam portion 105D of the rotating body 105 toward its lower end portion, while rotationally driving the rotating body 105 in the clockwise direction as viewed from above. Accordingly, the push-type input mechanism 100-1 according to the embodiment can rotationally drive the rotating body 105 in the clockwise direction, as viewed from above, in accordance with the push operation on the operation knob 102. Further, since the rotating body 105 is biased at all times in the counterclockwise direction (return rotation direction) as viewed from above by an elastic force generated by the torsion spring 105B, the upper cam surface 105Da of the cam portion 105D contacts the upper sliding surface 103Ba of the sliding portion 103B at all times. Therefore, in the push-type input mechanism 100-1 according to the embodiment, even if a vibration or a shock is applied, the rotating body 105 does not rotate away from the slider 103, and it can be ensured that the rotation angle of the rotating body 105 is in accordance with the amount of movement of the slider 103 downward (in the negative Z-axis direction).

Further, when the operation knob 102 is released from the push operation, the push-type input mechanism 100-1 according to the embodiment can cause the rotating body 105 to be rotated by an elastic force generated by the torsion spring 105B, provided in the upper opening 105*b* of the rotating body 105, in the counterclockwise direction as viewed from above. Accordingly, in the push-type input mechanism 100-1 according to the embodiment, while the upper cam surface 105Da of the cam portion 105D of the rotating body 105 slides in contact with the upper sliding surface 103Ba of the upper sliding portion 103B of the slider 103 at all times, the rotating body 105 rotates in accordance with the upward movement of the slider 103 (in the positive Z-axis direction) by an elastic force of the rubber domes 106A. As a result, the push-type input mechanism 100-1 according to the embodiment can cause the slider 103 to be pushed upward ((in the positive Z-axis direction) by the rubber domes 106A, thereby allowing the slider 103 to return to its initial position before the push operation while also allowing the rotating body 105 to return to its initial position.

Further, in the push-type input mechanism 100-1 according to the embodiment, the slider 103 includes the lower sliding portion 103C. Accordingly, the push-type input mechanism 100-1 according to the embodiment can cause the rotating body 105 to be rotationally driven in the return rotation direction (counterclockwise direction as viewed from above), even if a failure occurs in the rotation of the rotating body 105 in the return rotation direction (counterclockwise direction as viewed from above) due to an external object or the like being caught by the rotating body 105, and thus, the rotating body 105 is unable to rotate in accordance with the upward movement of the slider 103 when the operation knob 102 is released from a push operation. More specifically, even if a failure occurs in the rotation of the rotating body 105 in the return rotation direction (counterclockwise direction as viewed from above), and thus, the rotating body 105 is unable to rotate when the slider 103 is moved upward by a biasing force of the rubber domes 106A, the lower sliding portion 103C, which is spaced apart from the lower cam surface 105*db* of the cam portion 105D when the rotating body 105 returns to its initial position in a normal state, can contact the lower cam surface 105*db* of the cam portion 105D of the rotating body 105, which has currently stopped rotating, and can slide on the lower cam surface 105*db* toward the upper end portion, thereby causing the rotating body 105 to be rotationally driven in the return rotation direction (counterclockwise direction as viewed from above). Accordingly, even if the rotating body 105 is unable to be rotationally driven by an elastic force of the torsion spring 105B alone due to an external object or the like being caught by the rotating body 105, the push-type input mechanism 100-1 according to the embodiment can forcibly rotate the rotating body 105 in the return rotation direction (counterclockwise direction as viewed from above) and can reliably return the rotating body 105 to the initial rotation angle before the push operation.

Further, even if the cam portion 105D is, or both the upper sliding portion 103B and the lower sliding portion 103C of the slider 103 are, damaged and lost, the push-type input mechanism 100-1 according to the embodiment can return the rotation angle of the rotating body 105 to the initial rotation angle by a biasing force of the torsion spring 105B in the return rotation direction.

In the gap 103D between the upper sliding portion 103B and the lower sliding portion 103C, a small clearance is provided such that the cam portion 105D can slide smoothly in the gap 103D. This clearance would cause looseness of the cam portion 105D within the gap 103D.

However, as described above, in the push-type input mechanism 100-1 according to the embodiment, the cam portion 105D is biased by a biasing force generated by the torsion spring 105B of the rotating body 105, such that the rotating body 105 rotates in the counterclockwise as viewed from above. Therefore, the push-type input mechanism 100-1 according to the embodiment can bias the cam portion 105D in a direction in which the cam portion 105D is pressed against the upper sliding portion 103B at all times. That is, causing the cam portion 105D to be pressed in one direction within the gap 103D can prevent looseness. Accordingly, even when a shock or a vibration is applied, the rotational angle of the rotating body 105 can be prevented from becoming unstable due to the looseness of the cam portion 105D.

Further, as described above, the push-type input mechanism 100-1 according to the embodiment can bias the cam portion 105D in a direction in which the cam portion 105D contacts the upper sliding portion 103B at all times. Therefore, even when the slider 103 is suddenly operated, the preceding rotation (excessive rotation) of the rotating body 105 can be prevented, and thus, the rotating body 105 can reliably rotate in accordance with the sliding of the slider 103 in the upper-lower direction (Z-axis direction).

Small clearances are provided between the rotating body 105 and components (the shaft branch 101C and the pair of support portions 101E of the case 101 (see FIG. 4)) rotatably supporting the rotating body 105, such that the rotating body 105 can be smoothly rotated. These clearances would cause looseness of the rotating body 105 in the horizontal direction and the upper-lower direction. For this reason, in the push-type input mechanism 100-1 according to the embodiment, each of the upper sliding surface 103Ba and the upper cam surface 105Da is inclined at a predetermined inclination angle such that the height of each of the upper sliding surface 103Ba and the upper cam surface 105Da gradually decreases outward in the radial direction of the rotating body 105. Further, with this inclined configuration, the thickness of the cam portion 105D in the direction of the rotational axis (in the upper-lower direction) is set to become smaller from the inner side toward the outer side in the radial direction of the rotating body 105. With this inclined configuration, when the upper cam surface 105Da is pressed against the upper sliding surface 103Ba by a biasing force of the torsion spring 105B, a reaction force is generated in a direction perpendicular to the inclined upper cam surface 105Da. Components of this reaction force act as reaction forces in the downward direction (toward the support 101E) and in the horizontal direction (toward the rotational axis). In the push-type input mechanism 100-1 according to the embodiment, these reaction forces can cause the rotating body 105 to be biased and pressed in the downward direction (toward the support 101E) and in the horizontal direction (toward rotational axis) within the clearances between the rotating body 105 and the above-described components rotatably supporting the rotating body 105. Therefore, the push-type input mechanism 100-1 according to the embodiment can reduce looseness of the rotating body 105 in the horizontal direction and the upper-lower direction, and stably rotate the rotating body 105. Accordingly, the rotating body 105 can be reliably rotated in accordance with the sliding of the slider 103 in the upper-lower direction (Z-axis direction).

In the present embodiment, the rubber domes 106A are used as examples of "dome-shaped elastic bodies". However, the present embodiment is not limited thereto, and metal dome members or the like capable of being inverted may be used as examples of "dome-shaped elastic bodies".

In the present embodiment, the rotating body 105 has the "cam surfaces". However, the present embodiment is not limited thereto, and the slider 103 may have "cam surfaces".

<Switching Determination and Failure Determination Performed by Switch Device 50>

In the switch device 50 (see FIG. 5), the switching determination unit 122 determines the switching state of the operation knob 102 by making a majority decision based on four output values of the magnetic sensor 107C, and the failure determination unit 123 determines whether a failure has occurred for each of the GMR sensors of the magnetic sensor 107C. In the following, the output values of the magnetic sensor 107C will be described.

<Configuration of Magnetic Sensor 107C>

Figure 10A:
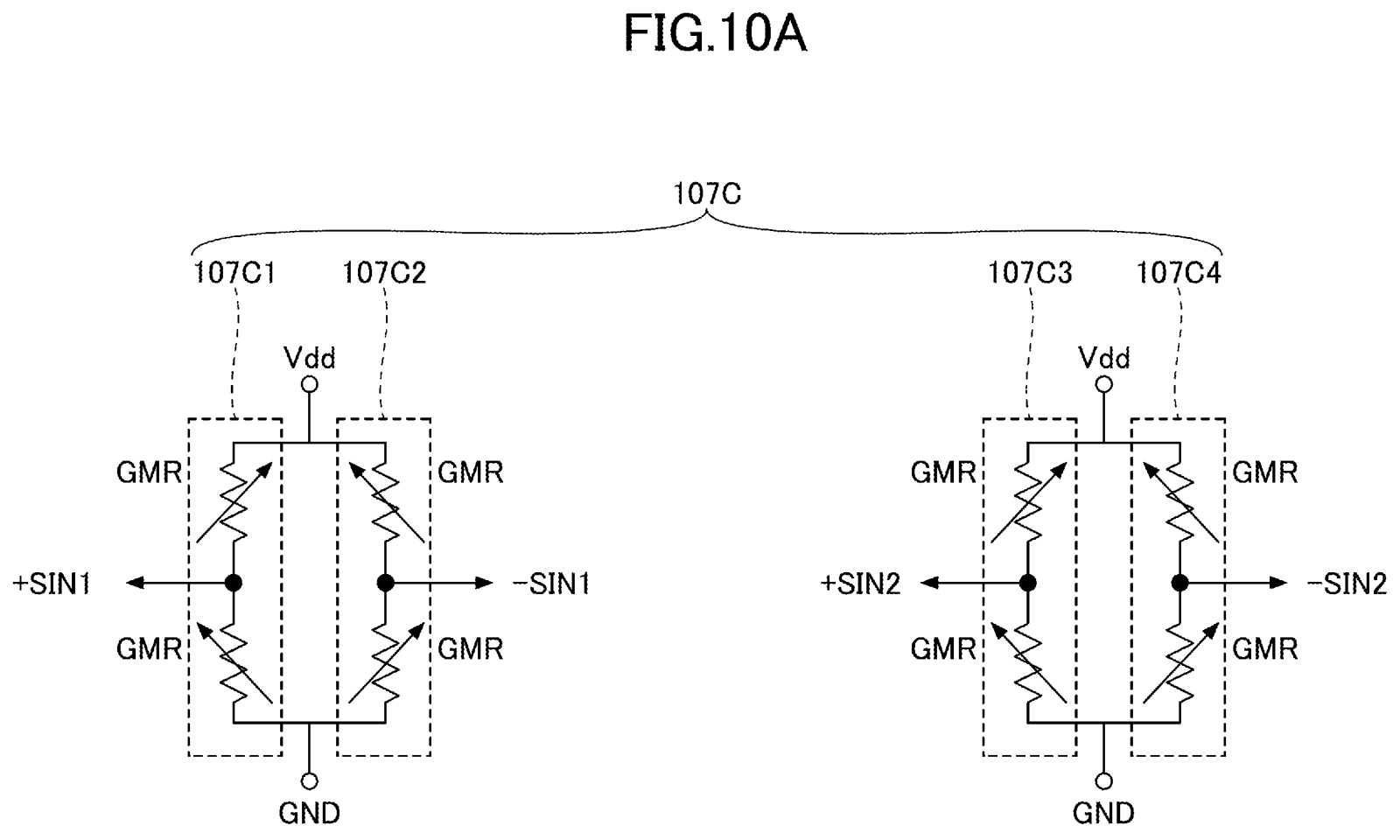

FIG. 10A is a diagram illustrating a configuration of the magnetic sensor 107C. The magnetic sensor 107C includes four GMR sensors 107C1 through 107C4. The GMR sensors 107C1 through 107C4 are examples of a plurality of (three or more) sensors. In the following, a configuration in which the magnetic sensor 107C includes the four GMR sensors 107C1 through 107C4 will be described. Note that the number of GMR sensors included in the magnetic sensor 107C may be three or more.

As illustrated in FIG. 10A, each of the GMR sensors 107C1 through 107C4 includes two GMR elements that are connected in series between power source Vdd and ground (GND). The GMR sensors 107C1 and 107C2 are connected in parallel, and the GMR sensors 107C3 and 107C4 are connected in parallel.

As the direction of the magnetic flux changes in accordance with the rotation of the magnet 105A in response to a push operation on the operation knob 102, the resistance value of each of the GMR elements of the GMR sensors 107C1 through 107C4 changes, and a sine wave is output from a connection point between two GMR elements connected in series. The polarities of four GMR elements included in the GMR sensors 107C1 and 107C2 are set such that a +SIN signal 1 and a −SIN signal 1 with a phase difference of 180 degrees are output. Likewise, the polarities of four GMR elements included in the GMR sensors 107C3 and 107C4 are such that a +SIN signal 2 and a −SIN signal 2 with a phase difference of 180 degrees are output.

The push-type shifter device 10 can detect the rotation angle of the rotating body 105 based on the +SIN signal 1, the −SIN signal 1, the +SIN signal 2, and the −SIN signal 2. The rotation angle of the rotating body 105 corresponds to the push operation amount of the operation knob 102. The push operation amount is the amount by which the operation knob 102 is pushed down.

Figure 10B:
FIG. 10B is a diagram illustrating example waveforms of a +SIN signal 1 and a −SIN signal 1 output from the magnetic sensor 107C.

FIG. 10B is a diagram illustrating example waveforms of the +SIN signal 1 and the −SIN signal 1 output from the magnetic sensor 107C. In FIG. 10B, the horizontal axis represents the rotation angle of the magnet 105A, and the vertical axis represents the voltage values of the +SIN signal 1 and the −SIN signal 1. A position (on the left side) where the rotation angle of the magnet 105A is −30 degrees corresponds to a state where no push operation is performed on the operation knob 102 and the push operation amount is zero. A position (on the right side) where the rotation angle of the magnet 105A is +30 degrees corresponds to a state where a push operation is performed on the operation knob 102 and the operation knob 102 is pushed down completely. In this state, the push operation amount is the maximum value.

As illustrated in FIG. 10B, the +SIN signal 1 and the −SIN signal 1 change in the range of ±30 degrees as the rotation angle of the magnet 105A changes in response to a push operation. At this time, in an angular range AR before and after the rotation angle of the magnet 105A of 0 degrees, the +SIN signal 1 and the −SIN signal 1 change linearly. As an example, the angular range AR is in the range of ±30 degrees. Note that, in this example, although the waveforms of the +SIN signal 1 and the −SIN signal 1 are described, the same applies to the +SIN signal 2 and the −SIN signal 2.

As a specific example, the +SIN signal 1 and the −SIN signal 1 change in the range of ±30 degrees as the rotation angle of the magnet 105A changes in response to a push operation; however, the range is not limited to ±30 degrees. Any range of angles may be used as long as, in the range of angles, the +SIN signal 1 and the −SIN signal 1 change linearly as the rotation angle of the magnet 105A changes in response a push operation.

Figure 10C:
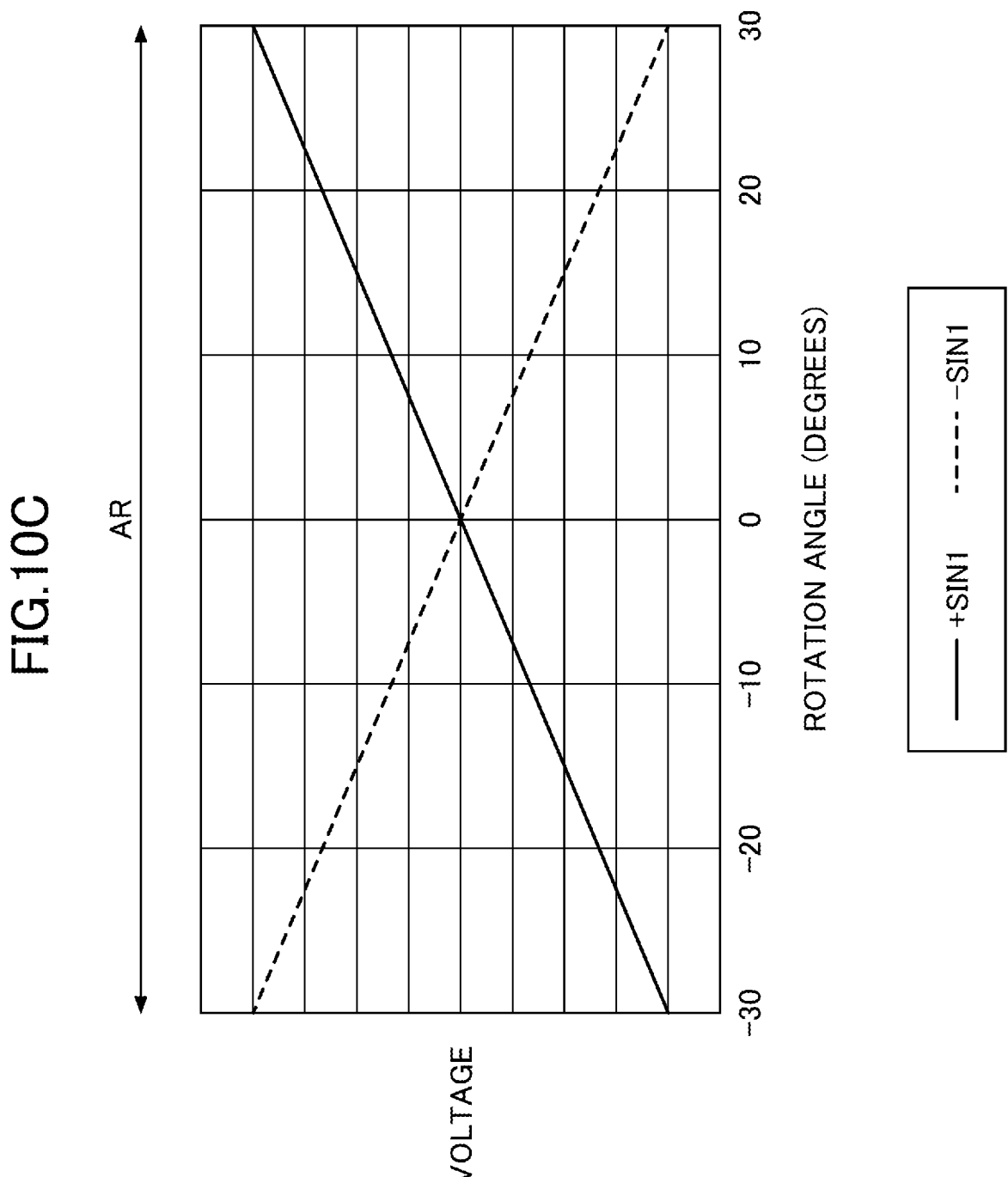
FIG. 10C is an enlarged view of an angular range AR.

FIG. 10C is an enlarged view of the angular range AR. In FIG. 10C, the horizontal axis represents the rotation angle of the magnet 105A, and the vertical axis represents the voltage values of the +SIN signal 1 and the −SIN signal 1. Although FIG. 10C depicts the waveforms of the +SIN signal 1 and the −SIN signal 1, the same applies to waveforms of the +SIN signal 2 and the −SIN signal 2.

The push-type shifter device 10 utilizes the angular range AR in which the +SIN signal 1, the −SIN signal 1, the +SIN signal 2, and the −SIN signal 2, output from the magnetic sensor 107C, change linearly with respect to the rotation angle of the magnet 105A, to determine whether the switch is turned on or off in response to a push operation (on/off determination).

<Calibration of Output Values of +SIN Signal 1, −SIN Signal 1, +SIN Signal 2, and −SIN Signal 2>

Figure 11:
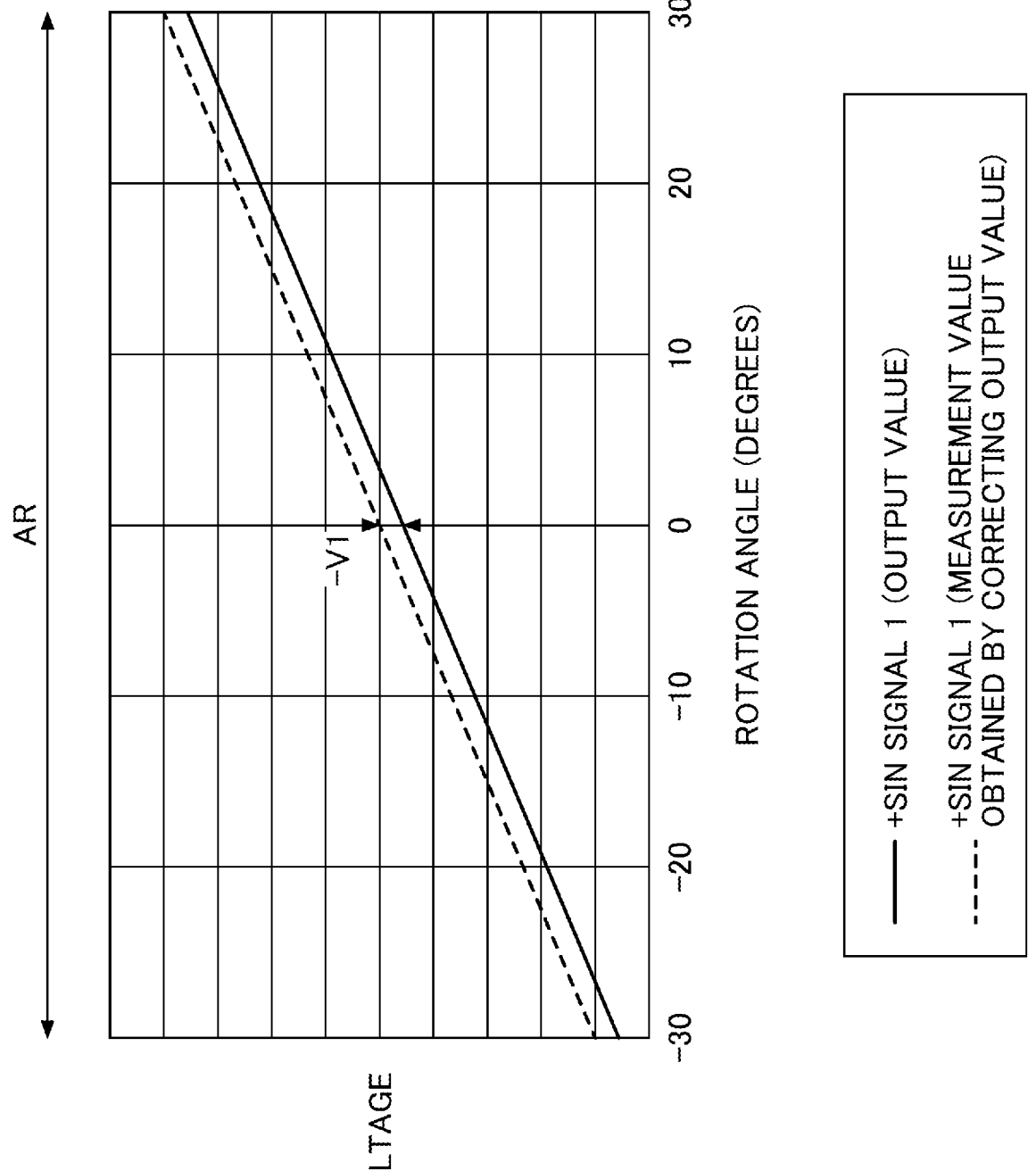
FIG. 11 is a diagram illustrating an output value of the +SIN signal 1 and a difference.

FIG. 11 is a diagram illustrating the calibration of an output value of the +SIN signal 1. In FIG. 11, the horizontal axis represents the rotation angle of the magnet 105A, and the vertical axis represents the voltage value of the +SIN signal 1. A solid line indicates the +SIN signal 1 (output value) actually output from the GMR sensor 107C1 (see FIG. 10A).

The output value of the GMR sensor 107C1 varies due to individual differences between built-in GMR elements. The same applies to the GMR sensors 107C2 through 107C4. If four output values of the GMR sensors 107C1 through 107C4 of the magnetic sensor 107C vary when the switching determination unit 122 determines the switching state of the operation knob 102 by making a majority decision based on the four output values of the GMR sensors 107C1 through 107C4, an accurate push operation amount of the operation knob 102 would not be obtained. Therefore, four actual output values of the GMR sensors 107C1 through 107C4 are calibrated based on the same reference, and the calibrated output values are taken as measurement values of the GMR sensors 107C1 through 107C4. The measurement values represent the angle (the rotation angle of the magnet 105A), and the rotation angle of the rotating body 105 corresponds to the push operation amount of the operation knob 102. Therefore, the measurement values represent the angle (the rotation angle of the magnet 105A) as well as the push operation amount of the operation knob 102.

As an example, after each of the push-type input mechanisms 100 is assembled, a push operation is performed on the operation knob 102, and four output values of the GMR sensors 107C1 through 107C4 are measured in a state in which the operation knob 102 is pushed by the same push operation amount (the operation knob 102 is in the same operation position) so as to calibrate the four output values of the GMR sensors 107C1 through 107C4. The output values measured in a state in which the operation knob 102 is pushed by the same push operation amount (the operation knob 102 is in the same operation position) are actually measured values.

For example, it is assumed that the same push operation amount (operation position) corresponds to 0 degrees, and a theoretical output value of each of the GMR sensors 107C1 through 107C4 at an angle of 0 degrees is 0 (V). Further, as indicated by the solid line in FIG. 11, it is assumed that the output of the +SIN signal 1 from the GMR sensor 107C1 deviates from 0 (V) by −V1 (V) at the angle of 0 degrees. In this case, −V1 (V) represents a difference between the output value of the GMR sensor 107C1 and the theoretical output value, that is, an error in the output value of the GMR sensor 107C1.

In the above-described case, a value obtained by subtracting the error (−V1) from the output value of the GMR sensor 107C1 has characteristics of becoming 0 (V) at an angle of 0 degrees as indicated by a dashed line. The characteristics indicated by the dashed line are characteristics of a measurement value obtained by calibrating the characteristics of the output value of the GMR sensor 107C1. In this manner, characteristics of the +SIN signal 1, the −SIN signal 1, the +SIN signal 2 and the −SIN signal 2 can be made uniform with respect to the push operation amount by calibrating errors in the output values (+SIN signal 1, −SIN signal 1, +SIN signal 2, and −SIN signal 2) of the GMR sensors 107C1 through 107C4 measured in a state in which the operation knob 102 is pushed by the same push operation amount (the operation knob 102 is in the same operation position). The errors between the output values of the GMR sensors 107C1 through 107C4 and the theoretical output value are calibration values.

The +SIN signal 1, the −SIN signal 1, the +SIN signal 2, and the −SIN signal 2 output from the GMR sensors 107C1 through 107C4 are converted into digital values and are then input into the controller 120. Therefore, values obtained by subtracting the errors (calibration values) between the actually measured values and the theoretical output value from the digital values, converted from the +SIN signal 1, the −SIN signal 1, the +SIN signal 2, and the −SIN signal 2, may be input into the controller 120 as measurement values of the GMR sensors 107C1 through 107C4. Characteristics of the measurement values obtained by the above-described calibration with respect to the angle approximately accurately represent the actual push operation amount of the operation knob 102. Therefore, the switching determination unit 122 can determine the switching state of the operation knob 102 with high accuracy based on the actual push operation amount of the operation knob 102. In addition, the failure determination unit 123 can perform a failure determination with high accuracy based on the actual push operation amount of the operation knob 102.

<Off-Range, Hysteresis Region, and On-Range>

Figure 12:
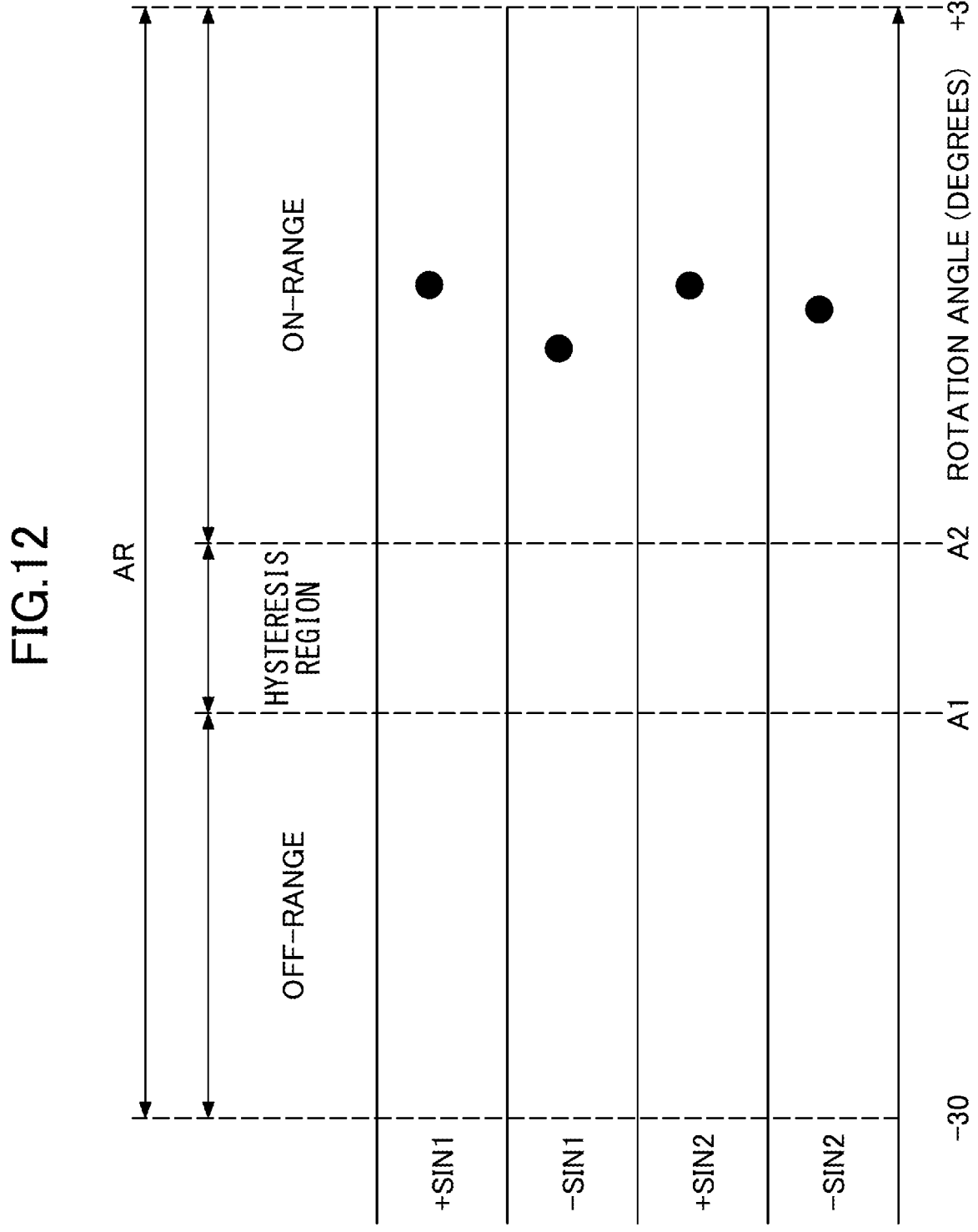
FIG. 12 is a diagram illustrating an off-range, a hysteresis region, and an on-range included in the angular range AR.

FIG. 12 is a diagram illustrating an off-range, a hysteresis region, and an on-range included in the angular range AR. FIG. 12 is a diagram illustrating the off-range, the hysteresis region, and the on-range, and is not a diagram illustrating a failure determination method performed by the switch device 50 according to the embodiment.

In FIG. 12, the horizontal axis represents an angle in the angular range AR. Angles (measurement values) represented by the +SIN signal 1, the −SIN signal 1, the +SIN signal 2, and the −SIN signal 2 are vertically arranged in four rows.

The off-range is an example of a first level range. The off-range, which is an example of the first level range, is a range of angles (measurement values) corresponding to a first level at which the operation knob 102 is in a switched-off state. The on-range is an example of a second level range. The on-range, which is an example of the second level range, is a range of angles (measurement values) corresponding to a second level at which the operation knob 102 is in a switched-on state. A hysteresis region is between the off-range and the on-range. The hysteresis region is an example of a third level range. As an example, the angular range AR is from +30 degrees to −30 degrees. Thus, the off-range is from −30 degrees to an angle (measurement value) less than a lower limit angle A1 of the hysteresis region, and the on-range is from an angle (measurement value) greater than an upper limit angle A2 of the hysteresis region to +30 degrees. The hysteresis region is a range (region) of angles (measurement values) including 0 degrees. The off-range and the on-range may be hereinafter referred to as level ranges. The level ranges represent levels of angles (measurement values).

Angles represented by the +SIN signal 1, the −SIN signal 1, the +SIN signal 2, and the −SIN signal 2 are indicated by black circles (●). In FIG. 12, as an example, all of the angles represented by the +SIN signal 1, the −SIN signal 1, the +SIN signal 2, and the −SIN signal 2 are in the ON-range.

Figure 13A:
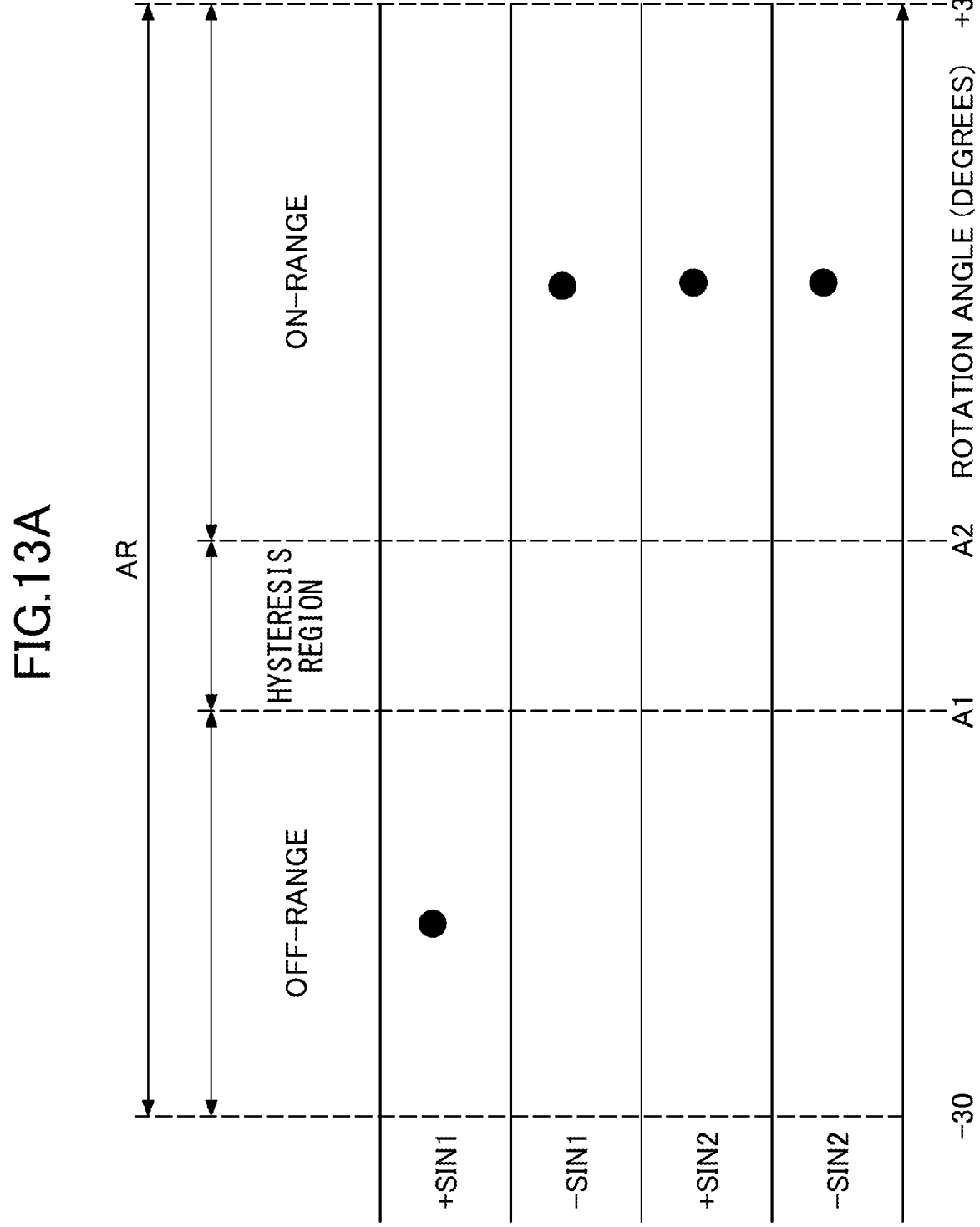
FIG. 13A is a diagram illustrating a failure determination method according to a comparative example.

FIG. 13A is a diagram illustrating a failure determination method according to a comparative example. Angles (measurement values) represented by the +SIN signal 1, the −SIN signal 1, the +SIN signal 2, and the −SIN signal 2 are indicated by black circles (●). In this example, it is assumed that the GMR sensor 107C1 that outputs the +SIN signal 1 has failed, and it is assumed that an angle represented by the +SIN signal 1 is fixed within the off-range.

In such a case, in the failure determination method according to the comparative example, failure determination is performed by simply making a majority decision based on output values of the +SIN signal 1, the −SIN signal 1, the +SIN signal 2 and the −SIN signal 2. Since only the one +SIN signal 1 is in the off-range, and the other three –SIN signal 1, +SIN signal 2, and –SIN signal 2 are in the on-range, a one-to-three ratio is established. As a result, in the failure determination method according to the comparative example, the GMR sensor 107C1 that outputs the +SIN signal 1 is determined to have failed.

Figure 13B:
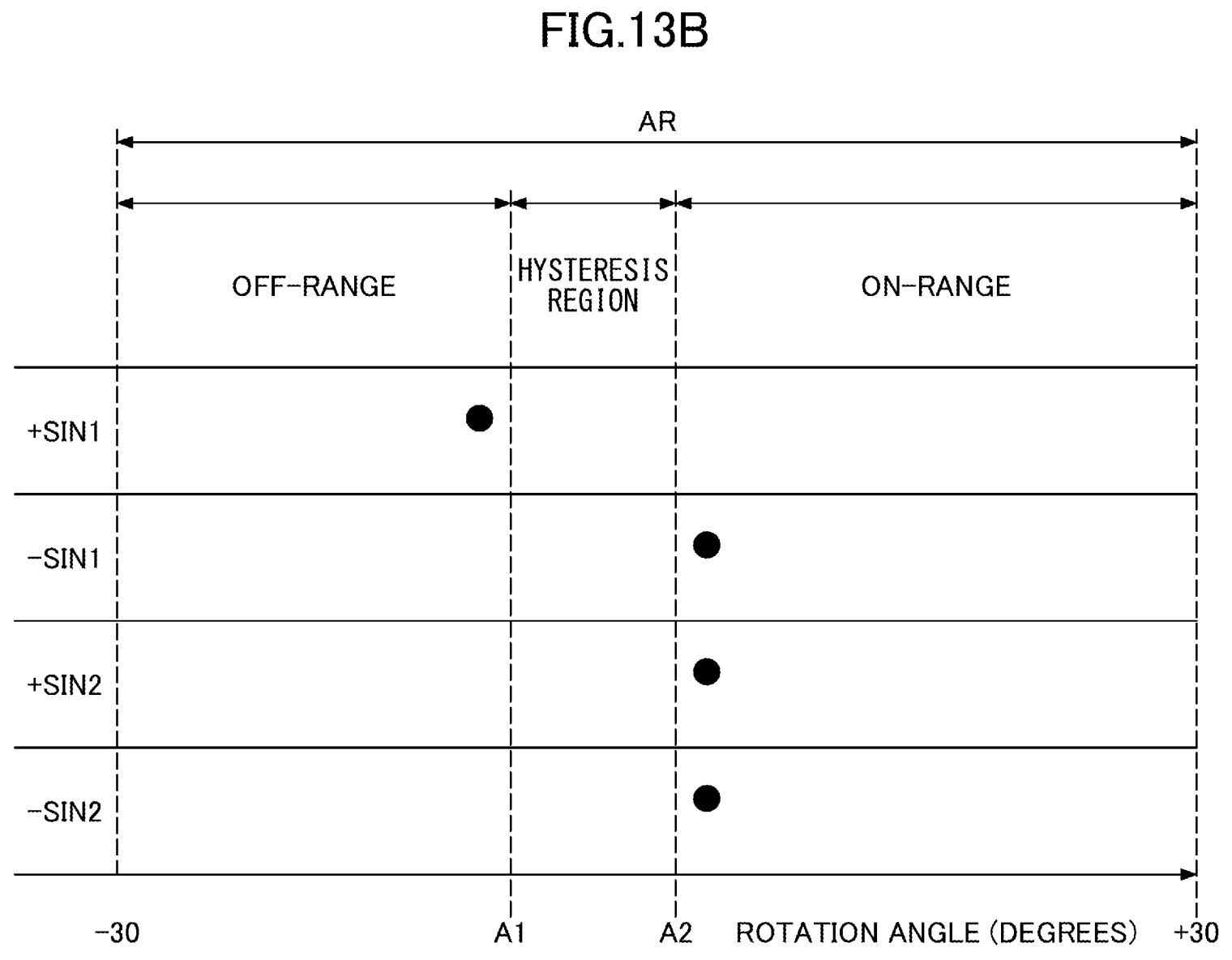

FIG. 13B is a diagram illustrating one problem with the failure determination method according to the comparative example. For example, if a push operation is performed on the operation knob 102 very slowly, there may be a case where an angle represented by the +SIN signal 1 is in the off-range and angles represented by the –SIN signal 1, the +SIN signal 2, and the –SIN signal 2 are in the on-range as illustrated in FIG. 13B if there are variations in how the angles (measurement values) of the GMR sensors 107C1 through 107C4 change. Even if the angles represented by the –SIN signal 1, the +SIN signal 2, and the –SIN signal 2 enter the on-range when the operation knob 102 is pushed to an intermediate position, there may be a case where the angle represented by the +SIN signal 1 is in the off-range. In such a case, it would be impossible to determine whether the GMR sensor 107C1 that outputs the +SIN signal 1 has failed or whether there are variations in how the angles (measurement values) of the GMR sensors 107C1 through 107C4 change. In addition, whether or not there is a failure needs to be determined as early as possible to meet safety requirements. However, the possibility of an erroneous determination would increase in a case as illustrated in FIG. 13B.

In view of the above, the switch device 50 according to the embodiment determines whether a failure has occurred by using a method described with reference to FIG. 14A and FIG. 14B.

<Failure Determination Method Performed by Switch Device 50 According to Embodiment>

Figure 14A:
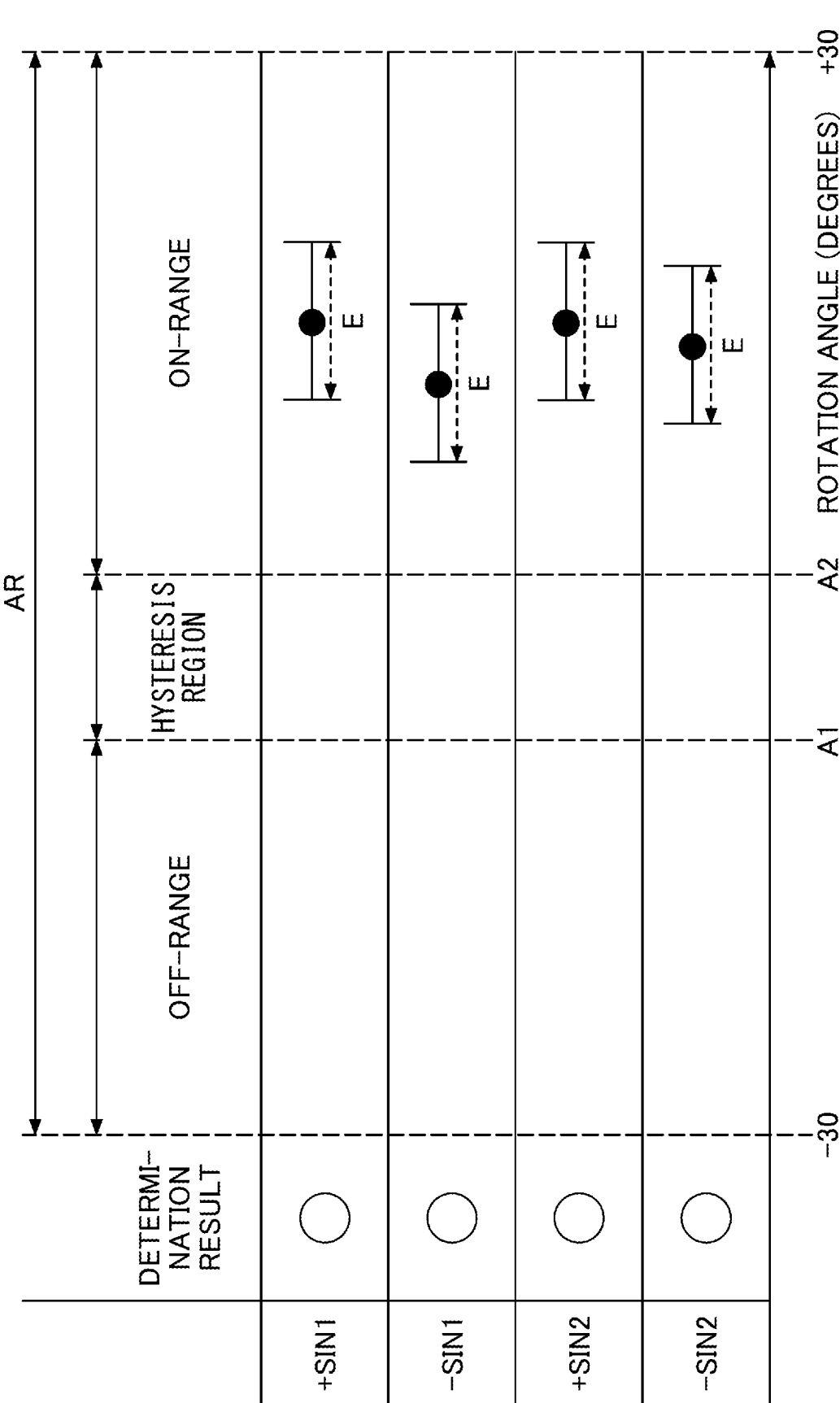
FIG. 14A is a diagram illustrating a failure determination method performed by a switch device 50 according to the embodiment.
Figure 14B:
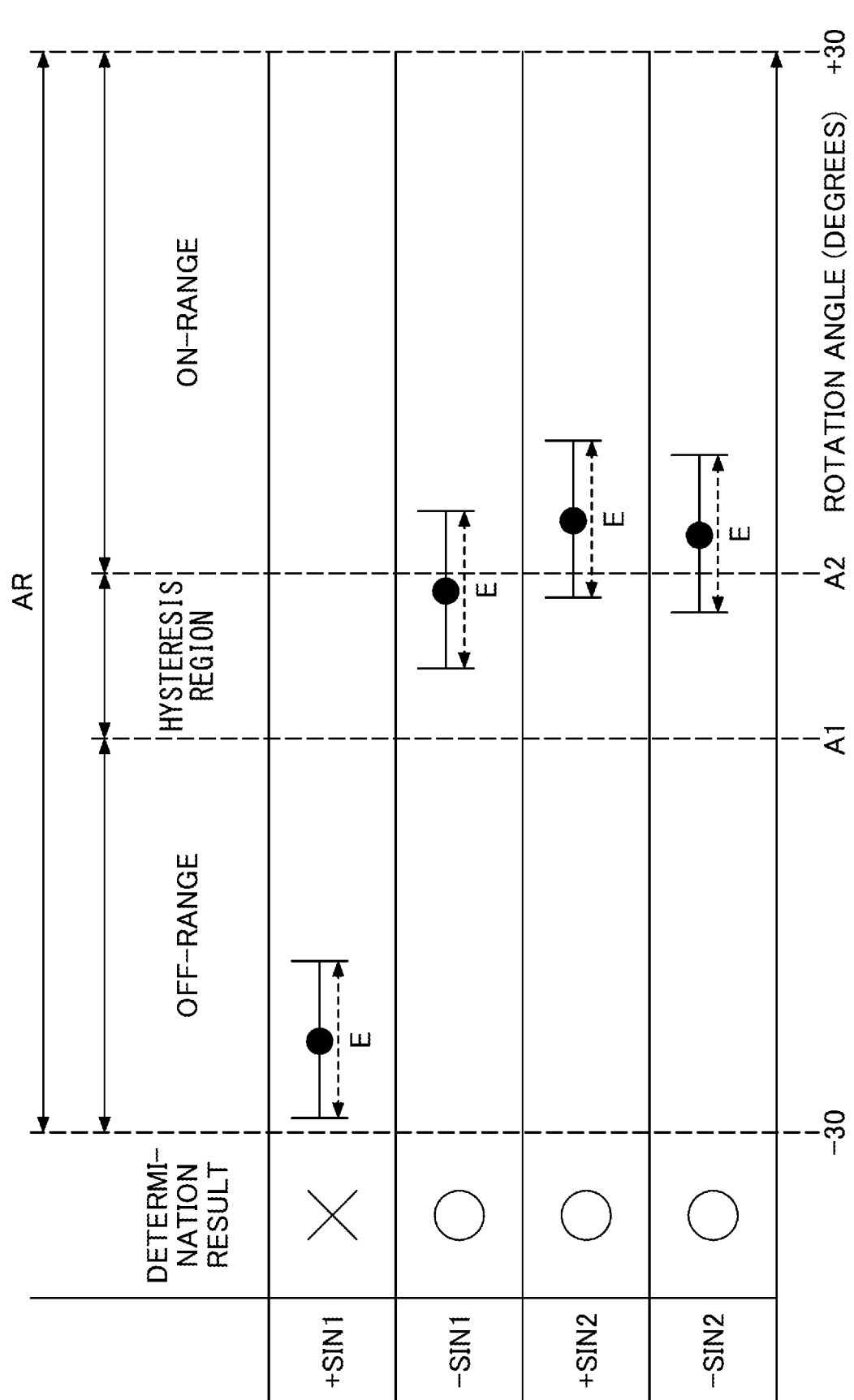
FIG. 14B is a diagram illustrating the failure determination method performed by the switch device 50 according to the embodiment.

FIG. 14A and FIG. 14B are diagrams illustrating a failure determination method performed by the switch device 50 according to the embodiment. In FIG. 14A and FIG. 14B, determination results made by the failure determination unit 123 about failures of the GMR sensors 107C1 through 107C4 that output the +SIN signal 1, the –SIN signal 1, the +SIN signal 2, and the –SIN signal 2 are indicated in four rows in the leftmost column. The determination results are indicated by circle marks "normal (o)" and cross marks "failed (x)".

In the failure determination according to the embodiment, predetermined ranges E are provided for respective measurement values of the +SIN signal 1, the –SIN signal 1, the +SIN signal 2 and the –SIN signal 2. In the predetermined ranges E, the measurement values are set as the medians. That is, each of the predetermined ranges E is a range from a lower limit value that is lower by E/2 (V) than the measurement value of the +SIN signal 1, the –SIN signal 1, the +SIN signal 2, or the –SIN signal 2 to an upper limit value that is higher by E/2 (V) than the measurement value of the +SIN signal 1, the –SIN signal 1, the +SIN signal 2, or the –SIN signal 2.

The predetermined ranges E correspond to error ranges that could occur in the measurement values of the GMR sensors 107C1 through 107C4 that are operating in a normal state and have not failed. As an example, each of the predetermined ranges E is beyond the hysteresis region from the lower limit angle A1 to the upper limit angle A2 in the high-low direction of measurement levels of the measurement values. Therefore, the switch device 50 can avoid an erroneous determination of a failure by taking into consideration measurement errors of the GMR sensors.

The switch device 50 calibrates output values of the +SIN signal 1, the –SIN signal 1, the +SIN signal 2 and the –SIN signal 2 at an angle of, for example, 0 degrees, which corresponds to same push operation amount (the same operation position), and performs a failure determination by using measurement values obtained by calibrating the output values. The predetermined ranges E of the measurement values are used as error ranges that could occur due to individual differences of the GMR sensors 107C1 through 107C4. The predetermined ranges E are used when a failure determination is performed by making a majority decision based on the measurement values of the +SIN signal 1, the –SIN signal 1, the +SIN signal 2, and the –SIN signal 2.

For example, in a case where the failure determination unit 123 determines whether a failure has occurred for the GMR sensor 107C1 that outputs the +SIN signal 1, the failure determination unit 123 determines whether half or more of the measurement values of the –SIN signal 1, the +SIN signal 2, and the –SIN signal 2 other than the +SIN signal 1 are in a predetermined range E of the measurement value of the +SIN signal 1. If half or more of the measurement values of the –SIN signal 1, the +SIN signal 2, and the –SIN signal 2 other than the +SIN signal 1 are in the predetermined range E of the measurement value of the +SIN signal 1, the failure determination unit 123 determines that the GMR sensor 107C1 is operating normally. Conversely, if half or more of the measurement values of the –SIN signal 1, the +SIN signal 2, and the –SIN signal 2 other than the +SIN signal 1 are not in the predetermined range E of the measurement value of the +SIN signal 1, the failure determination unit 123 determines that the GMR sensor 107C1 has failed.

The measurement values of the –SIN signal 1, the +SIN signal 2, and the –SIN signal 2 other than the +SIN signal 1, which are used by the switch device 50 to determine whether a failure has occurred for the GMR sensor 107C1, are measurement values of the other sensors (GMR sensors 107C2 through 107C4). Determining, by the failure determination unit 123, whether half or more of the measurement values of the –SIN signal 1, the +SIN signal 2, and the –SIN signal 2 other than the +SIN signal 1 are in the predetermined range E of the measurement value of the +SIN signal 1 means determining whether half or more of the measurement values of the other sensors (GMR sensors 107C2 through 107C4) are in the predetermined range E of the measurement value of the +SIN signal 1.

Similar to the above-described failure determination on the GMR sensor 107C1, the switch device 50 can determine whether a failure has occurred for each of the GMR sensors 107C2 through 107C4 by determining whether half or more of the measurement values of the other sensors are in a predetermined range E.

In FIG. 14A, all of measurement values of the +SIN signal 1, the –SIN signal 1, the +SIN signal 2, and the –SIN signal 2 are in the on-range. In addition, in a predetermined range E of the measurement value of each of the +SIN signal 1, the –SIN signal 1, the +SIN signal 2, and the –SIN signal 2, the measurement values of the other GMR sensors are included. Therefore, the failure determination unit 123 determines that all of the GMR sensors 107C1 through 107C4 are operating normally. Further, the switching determination unit 122 determines that the operation knob 102 is in a switched-on state by making a majority decision.

In FIG. 14B, a measurement value of the +SIN signal 1 is in the off-range, a measurement value of the –SIN signal 1 is in the hysteresis region, and measurement values of the +SIN signal 2 and the –SIN signal 2 are in the on-range.

In this case, the failure determination unit 123 determines whether a failure has occurred for the GMR sensor 107C1 that outputs the +SIN signal 1. Specifically, the failure determination unit 123 determines whether half or more of the measurement values of the other sensors are in a predetermined range E of the measurement value of the +SIN signal 1. Since none of the measurement values of the –SIN signal 1, the +SIN signal 2, and the –SIN signal 2 other than the +SIN signal 1 is in the predetermined range E of the measurement value of the +SIN signal 1, the failure determination unit 123 determines that the GMR sensor 107C1 has failed. This state corresponds to a state in which half or more of the measurement values of the other sensors are not in the predetermined range E of the measure value of the +SIN signal 1. Accordingly, the determination result is "failed (x)".

Further, the failure determination unit 123 determines whether a failure has occurred for the GMR sensor 107C2 that outputs the –SIN signal 1. Specifically, the failure determination unit determines whether half or more of the measurement values of the other sensors are in a predetermined range E of the measurement value of the –SIN signal 1. The two measurement values of the +SIN signal 2 and the –SIN signal 2 are in the predetermined range E of the measurement value of the –SIN signal 1. Therefore, the failure determination unit 123 determines that the GMR sensor 107C2 is operating normally. This state corresponds to a state in which half or more of the measurement values of the other sensors are in the predetermined range E of the measure value of the –SIN signal 1. Accordingly, the determination result is "normal (o)".

Further, the failure determination unit 123 determines whether a failure has occurred for the GMR sensor 107C3 that outputs the +SIN signal 2. Specifically, the failure determination unit 123 determines whether half or more of the measurement values of the other sensors are in a predetermined range E of the measurement value of the +SIN signal 2. The two measurement values of the –SIN signal 1 and the –SIN signal 2 are in the predetermined range E of the measurement value of the +SIN signal 2. Therefore, the failure determination unit 123 determines that the GMR sensor 107C3 is operating normally. This state corresponds to a state in which half or more of the measurement values of the other sensors are present in the predetermined range E of the measure value of the +SIN signal 2. Accordingly, the determination result is "normal (o)".

Further, the failure determination unit 123 determines whether a failure has occurred for the GMR sensor 107C4 that outputs the –SIN signal 2. Specifically, the failure determination unit 123 determines whether half or more of the measurement values of the other sensors are present in a predetermined range E of the measurement value of the –SIN signal 2. The two measurement values of the –SIN signal 1 and the +SIN signal 2 are present in the predetermined range E of the measurement value of the –SIN signal 2. Therefore, the failure determination unit 123 determines that the GMR sensor 107C4 is operating normally. This state corresponds to a state in which half or more of the measurement values of the other sensors are present in the predetermined range E of the measure value of the –SIN signal 2. Accordingly, the determination result is "normal (o)".

As illustrated in FIG. 14B, in a case where the GMR sensor 107C1 is determined to have failed and the GMR sensors 107C2 through 107C4 are determined to be operating normally, the measurement value of the GMR sensor 107C2, among the measurement values of the three normally-operating GMR sensors 107C2 through 107C4, is in the hysteresis region, and the measurement values of the GMR sensors 107C3 and 107C4 are in the on-range. In this case, since more than half of the measurement values of the three normally-operating GMR sensors 107C2 through 107C4 are in the on-range, the switching determination unit 122 determines that the operation knob 102 is on.

Figure 15A:
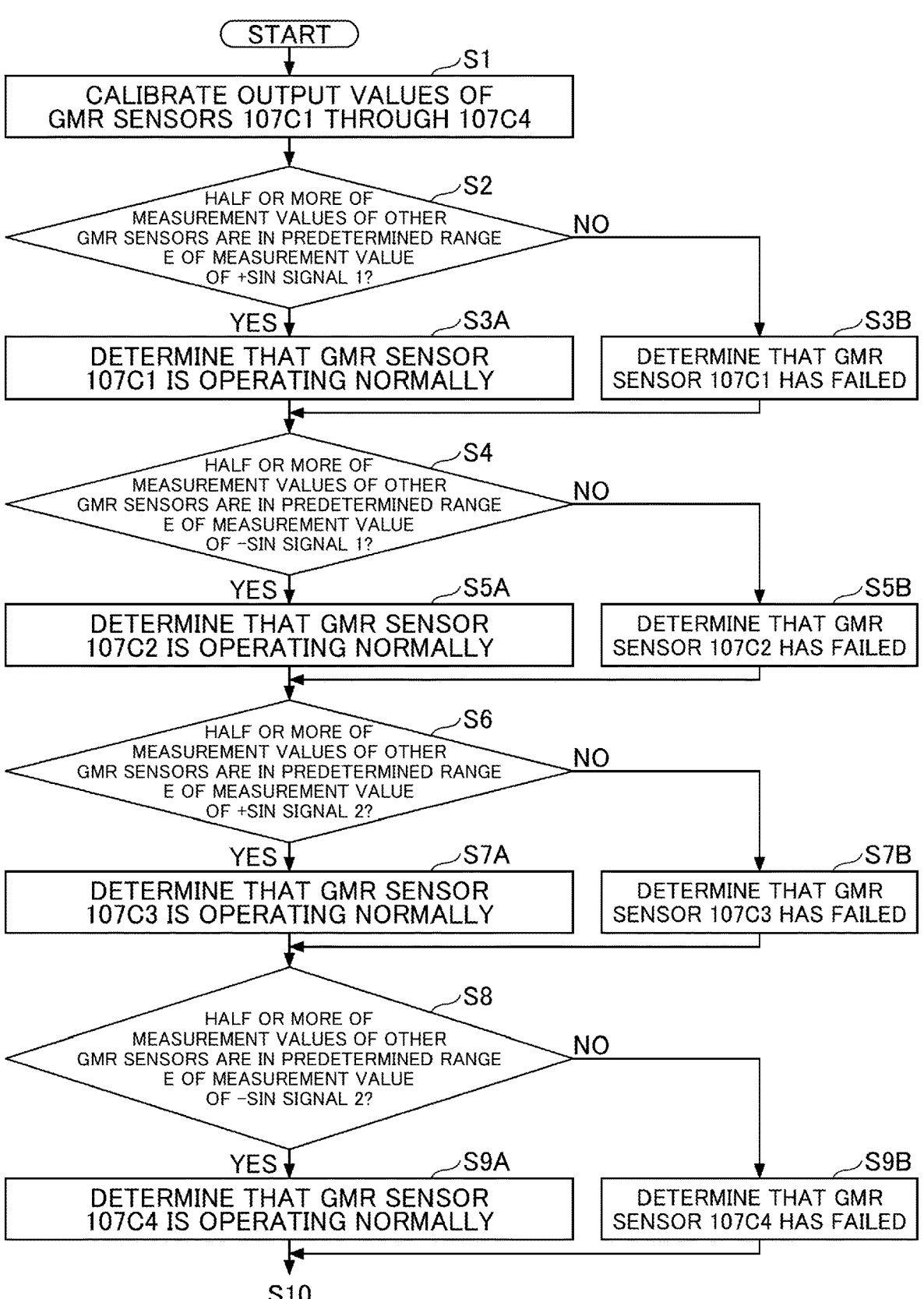
FIG. 15A is a flowchart illustrating a failure determination process performed by a failure determination unit 123.

FIG. 15A is a flowchart illustrating a failure determination process performed by the failure determination unit 123. Upon the start of the failure determination process, the failure determination unit 123 performs steps below.

The failure determination unit 123 calibrates output values of the GMR sensors 107C1 through 107C4 (step S1). As described about the +SIN signal 1 with reference to FIG. 11, the output values of the +SIN signal 1, the –SIN signal 1, the +SIN signal 2, and the –SIN signal 2 are calibrated by using the theoretical output value (0 (V)) of each of the GMR sensors 107C1 through 107C4 at an angle of 0 degrees, for example. The failure determination unit 123 uses measurement values obtained by calibrating the output values of the GMR sensors 107C1 through 107C4 to perform the failure determination process.

The failure determination unit 123 determines whether a failure has occurred for the GMR sensor 107C1 by determining whether half or more of the measurement values of the other GMR sensors are in a predetermined range E of the measurement value of the +SIN signal 1 (step S2).

If the failure determination unit 123 determines that half or more of the measurement values of the other GMR sensors are in the predetermined range E of the measurement value of the +SIN signal 1 (YES in step S2), the failure determination unit 123 determines that the GMR sensor 107C1 is operating normally (step S3A). The failure determination unit 123 stores data, indicating that the GMR sensor 107C1 is operating normally, in the memory 124. After step S3A ends, the failure determination unit 123 causes the flow to proceed to step S4.

Conversely, if the failure determination unit 123 determines that half or more of the measurement values of the other GMR sensors are not in the predetermined range E of the measurement value of the +SIN signal 1 (NO in step S2), the failure determination unit 123 determines that the GMR sensor 107C1 has failed (step S3B). The failure determination unit 123 stores data, indicating that the GMR sensor 107C1 has failed, in the memory 124. After step S3B ends, the failure determination unit 123 causes the flow to proceed to step S4.

The failure determination unit 123 determines whether a failure has occurred for the GMR sensor 107C2 by determining whether half or more of the measurement values of the other GMR sensors are in a predetermined range E of the measurement value of the –SIN signal 1 (step S4).

If the failure determination unit 123 determines that half or more of the measurement values of the other GMR sensors are in the predetermined range E of the measurement value of the –SIN signal 1 (YES in step S4), the failure determination unit 123 determines that the GMR sensor 107C2 is operating normally (step S5A). The failure determination unit 123 stores data, indicating that the GMR sensor 107C2 is operating normally, in the memory 124. After step S5A ends, the failure determination unit 123 causes the flow to proceed to step S6.

Conversely, if the failure determination unit 123 determines that half or more of the measurement values of the other GMR sensors are not in the predetermined range E of the measurement value of the –SIN signal 1 (NO in step S4), the failure determination unit 123 determines that the GMR sensor 107C2 has failed (step S5B). The failure determination unit 123 stores data, indicating that the GMR sensor 107C2 has failed, in the memory 124. After step S5B ends, the failure determination unit 123 causes the flow to proceed to step S6.

The failure determination unit 123 determines whether a failure has occurred for the GMR sensor 107C3 by determining whether half or more of the measurement values of the other GMR sensors are in a predetermined range E of the measurement value of the +SIN signal 2 (step S6).

If the failure determination unit 123 determines that half or more of the measurement values of the other GMR sensors are in the predetermined range E of the measurement value of the +SIN signal 2 (YES in step S6), the failure determination unit 123 determines that the GMR sensor 107C3 is operating normally (step S7A). The failure determination unit 123 stores data, indicating that the GMR sensor 107C3 is operating normally, in the memory 124. After step S7A ends, the failure determination unit 123 causes the flow to proceed to step S8.

Conversely, if the failure determination unit 123 determines that half or more of the measurement values of the other GMR sensors are not in the predetermined range E of the measurement value of the +SIN signal 2 (NO in step S6, the failure determination unit 123 determines that the GMR sensor 107C3 has failed (step S7B). The failure determination unit 123 stores data, indicating that the GMR sensor 107C3 has failed, in the memory 124. After step S7B ends, the failure determination unit 123 causes the flow to proceed to step S8.

The failure determination unit 123 determines whether a failure has occurred for the GMR sensor 107C4 by determining whether half or more of the measurement values of the other GMR sensors are in a predetermined range E of the measurement value of the −SIN signal 2 (step S8).

If the failure determination unit 123 determines that half or more of the measurement values of the other GMR sensors are in the predetermined range E of the measurement value of the −SIN signal 2 (YES in step S8), the failure determination unit 123 determines that the GMR sensor 107C4 is operating normally (step S9A). The failure determination unit 123 stores data, indicating that the GMR sensor 107C4 is operating normally, in the memory 124. After step S9A ends, the failure determination unit 123 causes the flow to proceed to step S10 illustrated in FIG. 15B.

Conversely, if the failure determination unit 123 determines that half or more of the measurement values of the other GMR sensors are not in the predetermined range E of the measurement value of the −SIN signal 2 (NO in step S8, the failure determination unit 123 determines that the GMR sensor 107C4 has failed (step S9B). The failure determination unit 123 stores data, indicating that the GMR sensor 107C4 has failed, in the memory 124.

The failure determination process performed by the failure determination unit 123 for the GMR sensors 107C1 through 107C4 ends. After step S9B ends, the failure determination unit 123 causes the flow to proceed to step S10 illustrated in FIG. 15B.

FIG. 15B is a flowchart illustrating a process performed by the switching determination unit 122 and the failure determination unit 123.

The failure determination unit 123 aggregates the determination results obtained in steps S2 through S9A or S9B (step S10).

The failure determination unit 123 determines whether the number of GMR sensors that are not determined to have failed is plural based on the aggregated results (step S11).

As a result of determining whether a failure has occurred for each of the GMR sensors 107C1 through 107C4, if the failure determination unit 123 determines that the number of GMR sensors that are not determined to have failed is plural (YES step S11), the switching determination unit 122 determines the switching state of the operation knob 102 by making a majority decision based on measurement levels of measurement values of the GMR sensors that are not determined to have failed (step S12A). In a case where the switch device 50 includes the four GMR sensors 107C1 through 107C4 and the number of GMR sensors that are determined to have failed is 0 to 2, the number of GMR sensors that are not determined to have failed is plural. In a case where the number of GMR sensors that are determined to have failed is 0, the switching determination unit 122 may determine the switching state of the operation knob 102 by making a majority decision based on measurement levels of measurement values of the four MR sensors 107C1 through 107C4. In a case where the number of GMR sensors that are determined to have failed is 1, the switching determination unit 122 may determine the switching state of the operation knob 102 by making a majority decision based on measurement levels of measurement values of three normally-operating GMR sensors. The example of this case has been described with reference to FIG. 14B. In a case where the number of GMR sensors that are determined to have failed is 2, the switching determination unit 122 may determine the switching state of the operation knob 102 by making a majority decision based on measurement levels of measurement values of two normally-operating GMR sensors. In the case of the two normally-operating GMR sensors, a majority decision is made by determining whether both the measurement levels of the two measurement values belong to the off-range or the on-range. That is, in the case of the two normally-operating GMR sensors, the switching determination unit 122 may determine that the operation knob 102 is in a switched-off state if both the measurement levels of the two measurement values belong to the off-range. Further, the switching determination unit 122 may determine that the operation knob 102 is in a switched-on state if both the measurement levels of the two measurement values both belong to the on-range.

As a result of determining whether a failure has occurred for each of the GMR sensors 107C1 through 107C4, if the failure determination unit 123 determines that the number of GMR sensors that are determined to have failed is less than half of the number of the GMR sensors 107C1 through 107C4, the switch device 50 uses measurement values of GMR sensors that are determined not to have failed to continue to operate thereafter (after a failure occurrence). For example, even if one of the GMR sensors 107C1 through 107C4 has failed, there are the three GMR sensors that are operating normally. Therefore, by continuously determining the switching state of the operation knob 102 by making a majority decision based on measurement values of the remaining three GMR sensors that are operating normally, the operator can use the switch device 50 after a failure occurrence in the same manner as before the failure occurrence.

Note that the switching determination unit 122 does not determine the switching state of the operation knob 102 if a plurality of measurement values are in the off-range, a plurality of measurement values are in the on-range, and the number of the measurement values in the off-range is equal to the number of the measurement values in the on-range. In other words, the switching determination unit 122 does not determine the switching state of the operation knob 102 if a plurality of level ranges (the on-range and the off-range, for example) include the largest number of measurement values. This is because the switching determination unit 122 cannot determine the switching state of the operation knob 102 by making a majority decision. For example, if two of four measurement values are in the off-range and the remaining two measurement values are in the on-range, the switching determination unit 122 cannot determine whether the operation knob 102 is on or off by making a majority decision. Therefore, the switching determination unit 122 does not determine the switching state of the operation knob 102. In this case, the switching determination unit 122 may output a determination result obtained in the previous process. Further, the switching determination unit 122 may suspend the determination of the switching state and may wait until a situation in which a plurality of measurement values are in the off-range, a plurality of measurement values are in the on-range, and the number of the measurement values in the off-range is equal to the number of the measurement values in the on-range is resolved, that is, until a majority decision can be made. Further, among measurement values of three normally-operating GMR sensors, if one measurement value is in the off-range, another one measurement value is in the hysteresis region, and the remaining one measurement value is in the on-range, the switching determination unit 122 cannot determine whether the operation knob 102 is on or off by making a majority decision, and thus, the switching determination unit 122 does not determine the switching state of the operation knob 102. The switching determination unit f122 may output a determination result obtained in the previous process or may wait until a majority decision can be made in this case as well.

Further, as a result of determining whether a failure has occurred for each of the GMR sensors 107C1 through 107C4, if the failure determination unit 123 determines that the number of GMR sensors that are not determined to have failed is not plural (NO in step S11), the failure determination unit 123 determines that the switch device 50 has completely failed and is unusable thereafter (after a failure occurrence), and outputs a determination result (step S12B). This is because, if the number of the remaining normally-operating GMR sensors is not plural, the switching determination unit 122 has difficulty in determining the switching state of the operation knob 102 appropriately. If the switch device 50 has completely failed, it means that the failed GMR sensors need to be replaced or the push-type shifter device 10 needs to be replaced with a new one. If three or more of the GMR sensors 107C1 through 107C4 have failed, the failure determination unit 123 determines that the switch device 50 has completely failed and is unusable thereafter, and outputs a determination result. Further, if the switch device 50 is installed in a vehicle, the switch device 50 may notify the user of the vehicle (the operator of the switch device 50) or the like of the complete failure via an in-vehicle network or the like. As a result, the the user (operator of the switch device 50) can be prevented from continuously using the switch device 50 and push-type shifter device 10, thereby enhancing safety.

FIG. 16 is a diagram illustrating a summary of determination patterns of the switching determination unit 122 and the failure determination unit 123. In FIG. 16, determination patterns based on measurement values of the four GMR sensors 107C1 through 107C4 are depicted.

If the number of GMR sensors determined to have failed by the failure determination unit 123 is 0 (the number of failed sensors is 0), the switching determination unit 122 determines the switching state (on or off) by making a majority decision based on measurement levels of normally-operating GMR sensors. Specifically, if measurement levels of three or more normally-operating GMR sensors belong to the on-range or the off-range, the switching determination unit 122 determines the switching state (on or off). If the number of GMR sensors determined to have failed by the failure determination unit 123 is 1 (the number of failed sensors is 1), the switching determination unit 122 determines the switching state (on or off) by making a majority decision based on measurement levels of normally-operating GMR sensors. Specifically, if measurement levels of two or more normally-operating GMR sensors both belong to the on-range or the off-range, the switching determination unit 122 determines the switching state (on or off).

If the number of GMR sensors determined to have failed by the failure determination unit 123 is 2 (the number of failed sensors is 2), the switching determination unit 122 determines the switching state (on or off) by making a majority decision based on measurement levels of normally-operating GMR sensors. Specifically, if measurement levels of two normally-operating GMR sensors belong to the on-range or the off-range, the switching determination unit 122 determines the switching state (on or off). That is, if two GMR sensors have failed, the switching determination unit 122 determines the switching state (on or off) if measurement levels of two normally-operating GMR sensors both belong to the on-range or the off-range.

If the number of failed GMR sensors is 0, 1, or 2, the switching determination unit 122 does not determine the switching state (on or off) unless the above-described conditions are met. In this case, the switching determination unit 122 may output a determination result obtained in the previous process.

If the number of GMR sensors determined to have failed by the failure determination unit 123 is 3 or 4 (the number of failed sensors is 3 or 4), the switching determination unit 122 does not determine the switching state and stops the operation.

If the number of GMR sensors determined to have failed is 0 (the number of failed sensors is 0), the failure determination unit 123 determines whether a failure has occurred for each of the four GMR sensors based on measurement values. In this case, the failure determination unit 123 determines that a given GMR sensor has failed if measurement values of less than two other GMR sensors are in a predetermined range range E of a measurement value of the given GMR sensor.

If the number of GMR sensors determined to have failed is 1 (the number of failed sensors is 1), the failure determination unit 123 determines whether a failure has occurred for each of the remaining three GMR sensors based on measurement values. In this case, the failure determination unit 123 determines that a given GMR sensor has failed if none of measurement values of the other GMR sensors is in a predetermined range E of a measurement value of the given GMR sensor.

If the number of GMR sensors determined to have failed is 2 (the number of failed sensors is 2), the failure determination unit 123 determines whether a failure has occurred for each of the remaining two GMR sensors based on measurement values. In this case, the failure determination unit 123 determines that one GMR sensor has failed if a measurement value of the other GMR sensor is not in a predetermined range E of a measurement value of the one GMR sensor. That is, if the number of failed GMR sensors is 2, the failure determination unit 123 determines that a GMR sensor has failed if one of two measurement values is in a predetermined range E of the other measurement value. In other words, the failure determination unit 123 determines that the remaining two GMR sensors have failed if each of measurement values is not in a predetermined range E of the other measurement value.

If the number of GMR sensors determined to have failed is 3 or 4 (the number of failed sensors is 3 or 4), the failure determination unit 123 does not determine a failure. This is because there is no comparison.

<Effects>

As described above, the failure determination unit 123 compares a measurement value of one GMR sensor among the plurality of GMR sensors 107C1 through 107C4 with measurement values of the other GMR sensors other than the one GMR sensor among the plurality of GMR sensors 107C1 through 107C4, and determines that the one GMR sensor has failed if half or more of the measurement values of the other GMR sensors are not in a predetermined range of the measurement value of the one GMR sensor.

An erroneous determination of a failure due to a measurement error of one GMR sensor can be prevented by determining whether half or more of measurement values of the other GMR sensors are in a predetermined range of a measurement value of the one GMR sensor.

Accordingly, the switch device 50 and the push-type shifter device 10, capable of avoiding an erroneous determination of a failure due to a measurement error or the like, can be provided.

Further, as a result of determining whether a failure has occurred for each of the GMR sensors 107C1 through 107C4, if the failure determination unit 123 determines that the number of GMR sensors that are not determined to have failed is plural, the failure determination unit 123 determines the switching state of the operation knob 102 by making a majority decision based on measurement levels levels of measurement values of the GMR sensors that are not determined to have failed. If a plurality of GMR sensors among the GMR sensors 107C1 through 107C4 are operating normally, the switching determination unit 122 can determine the switching state of the operation knob 102 by making a majority decision. In addition, determining the switching state by the switching determination unit 122 as described above does not cause a problem in the switch device 50 as a product requiring functional safety. Accordingly, in the switch device 50, if there are a plurality of GMR sensors that are operating normally, an erroneous determination of a failure due to a measurement error or the like can be reduced, and also, the switching determination unit 122 can determine the switching state of the operation knob 102 by making a majority decision based on the output of the GMR sensors. Further, if there are a plurality of GMR sensors that are operating normally, the switching determination unit 122 can determine the switching state of the operation knob 102 even if any of GMR sensors has failed. Accordingly, the tolerance of the switch device 50 to failures of the GMR sensors can be improved.

Further, as a result of determining whether a failure has occurred for each of the GMR sensors 107C1 through 107C4, if the failure determination unit 123 determines that the number of GMR sensors that are not determined to have failed is plural, the switch device 50 uses measurement values of the GMR sensors that are not determined to have failed to continue to operate thereafter (after a failure occurrence). By continuously determining the switching state of the operation knob 102 by making a majority decision based on the measurement values of the remaining GMR sensors that are operating normally, the operator can use the switch device 50 after a failure occurrence in the same manner as before the failure occurrence. Further, if there are a plurality of GMR sensors that are operating normally, the operator can continue to use the switch device 50 even if any of the GMR sensors has failed. Accordingly, the tolerance of the switch device 50 to failures of the GMR sensors can be improved. For example, if the failure determination unit 123 determines that three GMR sensors are operating normally and one GMR sensor has failed, the switching determination unit 122 uses the three normally-operating GMR sensors to determine the switching state next time.

Further, as a result of determining whether a failure has occurred for each of the GMR sensors 107C1 through 107C4, if the failure determination unit 123 determines that the number of GMR sensors that are not determined to have failed is not plural, the failure determination unit 123 determines that the switch device 50 has completely failed and is unusable thereafter (after a failure occurrence), and outputs a determination result. If the number of the remaining normally-operating GMR sensors is not plural, the switching determination unit 122, which is a product requiring functional safety, has difficulty in determining the switching state of the operation knob 102 while ensuring the safety. Therefore, by determining that the switch device 50 is unusable, the switch device 50 can be prevented from being continuously used, thereby enhancing safety.

Further, the GMR sensors have the hysteresis region between the off-range and the on-range. Therefore, when the switching determination unit 122 determines whether the operation knob 102 is on or off, influences of noise and the like can be reduced, thereby allowing the switching determination unit 122 to stably determine whether the operation knob 102 is on or off.

Each of the predetermined ranges E is beyond the hysteresis region in the high-low direction of measurement levels of measurement values. The predetermined ranges E correspond to error ranges that could occur in the output of the GMR sensors operating in a normal state. Therefore, the switch device 50 can avoid an erroneous determination of a failure by taking into consideration measurement errors of the GMR sensors. Further, when each of the predetermined ranges E is beyond the hysteresis region, there may be a case where two of measurement values of the four GMR sensors 107C1 through 107C4 are in the off-range and the remaining two measurement values are in the on-range. In such a case, the switching determination unit 122 can output a determination result obtained in the previous process, thereby stabilizing the operation. Alternatively, the switching determination unit 122 may suspend the determination of the switching state and wait until a majority decision can be made. Accordingly, the tolerance of the switch device 50 to failures of the GMR sensors can be improved.

The switching determination unit 122 does not determine the switching state of the operation knob 102 if a plurality of measurement values are in the off-range, a plurality of measurement values are in the on-range, and the number of the measurement values in the off-range is equal to the number of the measurement values in the on-range. In other words, the switching determination unit 122 does not determine the switching state of the operation knob 102 if a plurality of level ranges (the on-range and the off-range, for example) include the largest number of measurement values.

This is because the switching determination unit 122 cannot determine the switching state of the operation knob 102 by making a majority decision. By causing the switching determination unit 122 not to determine the switching state of the operation knob 102, the tolerance of the switch device 50 to failures of the GMR sensors can be improved. As described above, if two of measurement values of the four GMR sensors 107C1 through 107C4 are in the off-range and the remaining two measurement values are in the on-range, the switching determination unit 122 does not determine the switching state of the operation knob 102, thereby improving the tolerance of the switch device 50 to failures of the GMR sensors. Further, if one of measurement values of three normally-operating GMR sensors is in the off-range, another one measurement value is in the hysteresis region, and the remaining one measurement value is in the on-range, the switching determination unit 122 does not determine the switching state of the operation knob 102 since a majority decision can be made. Accordingly, the tolerance of the switch device 50 to failures of the GMR sensors can be improved.

The first level range is a level range corresponding to a switched-off state, and the second level range is a level range corresponding to a switched-on state. Therefore, the noise tolerance of the switch device 50 that takes two values of "on" and "off" can be improved.

Each of measurement values of the plurality of GMR sensors 107C1 through 107C4 is a value obtained by subtracting, from an output value of each of the GMR sensors 107C1 through 107C4, a deference (an error) between an actually measured value, which is measured by each of the GMR sensors 107C1 through 107C4 in a state in which the operation knob 102 is in the same operation position, and a theoretical output value of each of the GMR sensors 107C1 through 107C4 when the operation knob 102 is in the same operation position. Therefore, even if actually measured values of the GMR sensors 107C1 through 107C4 vary with respect to the push operation amount of the operation knob 102 due to measurement errors of any of the GMR sensors 107C1 through 107C4, the switch device 50 can avoid an erroneous determination of a failure due to the measurement errors of the GMR sensors 107C1 through 107C4.

Further, a non-volatile memory is used as the memory 124 that retains determination results by the failure determination unit 123. Therefore, the switch device 50 can identify a failure state of a GMR sensor even if the switch device 50 is turned off due to no power being supplied from a battery or the like and then restored. The switch device 50 can operate without using the failed GMR sensor.

Further, the plurality of GMR sensors 107C1 through 107C4 are the four GMR sensors. Accordingly, an erroneous determination of a failure due to measurement errors of the GMR sensors can be avoided.

The push-type shifter device 10 includes the operation knob 102 on which a push operation is to be performed by an operator, the rubber domes 106A configured to provide a clicking sensation in response to the push operation, the slider 103 configured to slide in the predetermined sliding direction in accordance with the push operation, the rotating body 105 configured to rotate in accordance with the sliding of the slider 10, the plurality of GMR sensors 107C1 through 107C4 (three or more GMR sensors) configured to detect a plurality of respective measurement values with respect to the rotation angle of the rotating body 105, the switching determination unit 122 configured to determine the switching state of the operation knob 102 by making a majority decision based on measurement levels of the measurement values of the plurality of GMR sensors 107C1 through 107C4, and the failure determination unit 123 configured to determine whether a failure has occurred for each of the GMR sensors 107C1 through 107C4. The failure determination unit 123 compares a measurement value of one GMR sensor among the plurality of GMR sensors 107C1 through 107C4 with measurement values of the other GMR sensors other than the one GMR sensor among the plurality of GMR sensors 107C1 through 107C4, and determines that the one GMR sensor has failed if half or more of the measurement values of the other GMR sensors are not in a predetermined range of the measurement value of the one GMR sensor. Accordingly, the switch device 50 capable of avoiding an erroneous determination of a failure due to a measurement error or the like can be provided.

In the above description, the push-type shifter device 10, which is the example of the electronic shifter, includes the operation knob 102, the rubber domes 106A, the slider 103, and the rotating body 105, and the GMR sensors 107C1 through 107C4 detect changes in the direction of the magnetic flux in accordance with the rotation of the rotating body 105. However, a mechanical configuration of the push-type shifter device 10, which is the example of the electronic shifter, is not limited to the above-described configuration, and may have any configuration as long as the direction of the magnetic flux changes in response to a switch operation.

In the above description, the switch device 50 includes the four GMR sensors 107C1 through 107C4. However, the switch device 50 may include two or more GMR sensors as long as a failure can be determined in a similar manner.

For example, if the switch device 50 includes six GMR sensors, the failure determination unit 123 determines a failure as described below, and the switching determination unit 122 determines the switching state of the operation knob 102 as described below.

In a case where the switch device 50 includes the six GMR sensors, the failure determination unit 123 determines whether a failure has occurred as follows. If a measurement value of one GMR sensor and measurement values of three or more other GMR sensors are in the same range (in one of the off-range, the hysteresis region, and the on-range), the failure determination unit 123 determines that the one GMR sensor is operating normally. Conversely, if the switch device 50 includes the six GMR sensors and a measurement value of one GMR sensor and measurement values of less than three other GMR sensors are in the same range (in one of the off-range, the hysteresis region, and the on-range), the failure determination unit 123 determines that the one GMR sensor has failed.

As a result of determining whether a failure has occurred for each of the six GMR sensors, if the failure determination unit 123 determines that two or more GMR sensors are not determined to have failed, the switching determination unit 122 determines the switching state of the operation knob 102 by making a majority decision based on measurement levels of measurement values of the two or more GMR sensors that are not determined to have failed.

As a result of determining whether a failure has occurred for each of the six GMR sensors, if the failure determination unit 123 determines that the number of GMR sensors that are not determined to have failed is not plural, that is, 1 or less, the failure determination unit 123 determines that the switch device 50 has completely failed and is unusable thereafter (after a failure occurrence), and outputs a determination result.

As a result of determining whether a failure has occurred for each of the six GMR sensors, if a plurality of measurement values among six measurement values are in the off-range, a plurality of measurement values among the six measurement values are in the on-range, and the number of the measurement values in the off-range is equal to the number of the measurement values in the on-range, the switching determination unit 122 does not determine the switching state of the operation knob 102. In other words, the switching determination unit 122 does not determine the switching state of the operation knob 102 if a plurality of level ranges (the on-range and the off-range, for example) include the largest number of measurement values.

Accordingly, if the switch device 50 includes the six GMR sensors, the failure determination unit 123 can determine a failure in a similar manner to the case where the switch device 50 includes the above-described four GMR sensors 107C1 through 107C4.

According to the present disclosure, the switch device, the push-type input device, and the electronic shifter capable of avoiding an erroneous determination of a failure due to a measurement error and the like can be provided.

Although the switch device, the push-type input device, and the electronic shifter according to specific embodiments have been described, the present disclosure is not limited to the specific embodiments, and various modifications and alternations can be made without departing from the scope of the claims.

What is claimed is:

1. A switch device comprising:
three or more sensors configured to detect three or more respective measurement values with respect to an operation position of a switch, said three or more respective measurement values being a rotation angle of a rotating body that rotates according to an operation of the switch;
a memory; and
a processor coupled to the memory and configured to
determine a switching state of the switch by making a majority decision based on measurement levels of the three or more measurement values of the three or more sensors, and
determine whether a failure has occurred for each of the three or more sensors,
wherein the processor compares a measurement value of one sensor among the three or more sensors with measurement values of other sensors other than the one sensor among the three or more sensors, and determines that the one sensor has failed in a case where half or more of the measurement values of the other sensors are not in a predetermined range of the measurement value of the one sensor, said predetermined range of the measurement value of the one sensor including the detected rotation angle of the one sensor.

2. The switch device according to claim 1, wherein in a case where the processor determines that a number of sensors that are not determined to have failed is plural as a result of determining whether the failure has occurred for each of the three or more sensors, the processor determines the switching state of the switch by making a majority decision based on measurement levels of measurement values of the sensors that are not determined to have failed.

3. The switch device according to claim 1, wherein in a case where the processor determines that a number of sensors that are not determined to have failed is plural as a result of determining whether the failure has occurred for each of the three or more sensors, the switch device uses the sensors that are not determined to have failed to continue to operate thereafter.

4. The switch device according to claim 1, wherein in a case where the processor determines that a number of sensors that are not determined to have failed is not plural as a result of determining whether the failure has occurred for each of the three or more sensors, the processor determines that the switch device has completely failed and is unusable thereafter, and outputs a determination result.

5. The switch device according to claim 1, wherein the three or more sensors have a hysteresis region between a first level range and a second level range of the three or more measurement values, the hysteresis region serving as a third level range, and
wherein the predetermined range is different from the first level range of the three or more measurement values and the predetermined range is different from the second level range of the three or more measurement values.

6. The switch device according to claim 5, wherein the predetermined range is beyond the hysteresis region in a high-low direction of the measurement levels of the three or more measurement values.

7. The switch device according to claim 5, wherein the first level range is a level range corresponding to a switched-off state, and the second level range is a level range corresponding to a switched-on state.

8. The switch device according to claim 5, wherein the predetermined range is narrower than the first level range of the three or more measurement values, and the predetermined range is narrower than the second level range of the three or more measurement values.

9. The switch device according to claim 1, wherein the processor does not determine the switching state of the switch in a case where a plurality of level ranges include a largest number of measurement values among the three or more measurement values.

10. The switch device according to claim 1, wherein each of the three or more measurement values of the three or more sensors is a value obtained by subtracting, from an output value of each of the three or more sensors, a difference between an actually measured value and a theoretical output value of each of the three or more sensors when the switch is in a same operation position, the actually measured value being measured by each of the three or more sensors in a state in which the switch is in the same operation position.

11. The switch device according to claim 10, wherein the predetermined range of the measurement value of the one sensor is a predetermined rotation angle range including the detected rotation angle of the one sensor and dynamically set based on the measurement value of the one sensor.

12. The switch device according to claim 1, further comprising
a non-volatile memory configured to retain a determination result of the processor.

13. The switch device according to claim 1, wherein the three or more sensors are four sensors.

14. A push-type input device comprising:
a switch on which a push operation is to be performed by an operator;
a rotating body configured to rotate in accordance with the push operation of the switch;
three or more sensors configured to detect three or more respective measurement values of a rotation angle of the rotating body;
a memory; and a processor coupled to the memory and configured to determine a switching state of the switch by making a majority decision based on measurement levels of the three or more measurement values of the three or more sensors, and determine whether a failure has occurred for each of the three or more sensors, wherein the processor compares a measurement value of one sensor among the three or more sensors with measurement values of other sensors other than the one sensor among the three or more sensors, and determines that the one sensor has failed in a case where half or more of the measurement values of the other sensors are not in a predetermined range of the measurement value of the one sensor, said predetermined range of the measurement value of the one sensor including a predetermined rotation angle including the detected rotation angle of the one sensor.

15. The push-type input device according to claim 14, further comprising:

a clicking sensation-providing mechanism configured to provide a clicking sensation in response to the push operation;

a slider configured to slide in a predetermined sliding direction in accordance with the push operation;

a biasing member configured to bias the rotating body in a return rotation direction; and a magnet configured to be held by the rotating body, wherein the rotating body includes a spiral-shaped cam portion provided on an outer peripheral surface of the rotating body and having an upper cam surface, the slider includes an upper sliding portion configured to rotate the rotating body by sliding on the upper cam surface in accordance with the sliding of the slider downward, the upper cam surface of the rotating body is biased by a biasing force of the biasing member at all times in a direction in which the upper cam surface is pressed against the upper sliding portion of the slider, and each of the three or more sensors is a magnetic sensor mounted on a substrate and configured to detect a rotation angle of the magnet held by the rotating body.

16. An electronic shifter comprising:

a switch configured to select a shift position of a vehicle, three or more sensors configured to detect three or more respective measurement values with respect to an operation position of the switch, said three or more respective measurement values being a rotation angle of a rotating body that rotates according to an operation of the switch;

a memory; and a processor coupled to the memory and configured to determine a switching state of the switch by making a majority decision based on measurement levels of the three or more measurement values of the three or more sensors, and determine whether a failure has occurred for each of the three or more sensors, wherein the processor compares a measurement value of one sensor among the three or more sensors with measurement values of other sensors other than the one sensor among the three or more sensors, and determines that the one sensor has failed in a case where half or more of the measurement values the other sensors are not in a predetermined range of the measurement value of the one sensor, said predetermined range of the measurement value of the one sensor including the detected rotation angle of the one sensor.

* * * * *